(12) United States Patent
Chang

(10) Patent No.: US 12,405,099 B2
(45) Date of Patent: Sep. 2, 2025

(54) CLAMP-ON TYPE PIPELINE MEASURING DEVICES AND FIXING STRUCTURES OF THE SAME

(71) Applicant: United Benefit Corp., New Taipei (TW)

(72) Inventor: Yuan Hse Chang, New Taipei (CN)

(73) Assignee: United Benefit Corp., New Taipei (TW)

( * ) Notice: Subject to any disclaimer, the term of this patent is extended or adjusted under 35 U.S.C. 154(b) by 392 days.

(21) Appl. No.: 18/310,866

(22) Filed: May 2, 2023

(65) Prior Publication Data
US 2023/0384075 A1 Nov. 30, 2023

(30) Foreign Application Priority Data
May 26, 2022 (TW) .................................. 111119735

(51) Int. Cl.
*G01B 5/24* (2006.01)
*G01B 5/00* (2006.01)

(52) U.S. Cl.
CPC .................. *G01B 5/0004* (2013.01)

(58) Field of Classification Search
CPC ........... G01B 5/24; G01B 5/28; G01B 5/0004
USPC .................................. 33/412, 529, 613, 645
See application file for complete search history.

(56) References Cited

U.S. PATENT DOCUMENTS

| | | | | |
|---|---|---|---|---|
| 4,586,264 A * | 5/1986 | Zatezalo | ................... | G01B 5/24 33/645 |
| 4,708,330 A * | 11/1987 | Ehl | ..................... | B23K 37/0531 269/73 |
| 4,750,662 A * | 6/1988 | Kagimoto | ............... | B25B 5/147 228/44.5 |
| 4,832,530 A * | 5/1989 | Andersen | .................. | F16L 1/26 81/57.24 |
| 4,981,395 A * | 1/1991 | Datin | ........................ | F16L 1/10 405/154.1 |
| 5,052,608 A * | 10/1991 | McClure | ............ | B23K 37/0533 228/49.4 |
| 5,359,781 A * | 11/1994 | Melville | ................ | G01B 11/27 33/645 |
| 5,560,091 A * | 10/1996 | Labit, Jr. | ................... | F16L 1/10 29/272 |
| 5,886,314 A * | 3/1999 | Sims | ...................... | B23K 10/00 219/61.5 |

(Continued)

*Primary Examiner* — George B Bennett
(74) *Attorney, Agent, or Firm* — Wang Law Firm, Inc.

(57) ABSTRACT

Provided is a fixing structure of a clamp-on type pipeline measuring device, which includes a clamp and an aligning member, the clamp is detachably fixed on an outer surface of a pipeline along an axis on the outer surface of the pipeline, the aligning member is disposed in the clamp, wherein a plane tangent to the outer surface of the pipeline on the axis is defined as an installation datum plane. During detaching and fixing the clamp, the aligning member moves along a normal direction of the installation datum plane; after the clamp is fixed to the outer surface of the pipeline, the aligning member contacts at least two line segments on the outer surface of the pipeline, and distances between the two line segments and the installation datum plane are the same. The clamp-on type pipeline measuring device including the fixing structure is further provided.

10 Claims, 26 Drawing Sheets

(56) References Cited

U.S. PATENT DOCUMENTS

| | | | | |
|---|---|---|---|---|
| 6,052,911 | A * | 4/2000 | Davis | G01B 11/27 |
| | | | | 33/529 |
| 7,240,437 | B1 * | 7/2007 | Moldovan | B25H 7/005 |
| | | | | 33/529 |
| 7,475,602 | B2 * | 1/2009 | Molenaar | G01F 1/662 |
| | | | | 73/866.5 |
| 7,891,713 | B2 * | 2/2011 | Bekkevold | F16L 23/08 |
| | | | | 285/410 |
| 9,687,941 | B2 * | 6/2017 | McClure | F16L 55/07 |
| 9,808,893 | B2 * | 11/2017 | McClure | B25B 5/147 |
| 10,281,437 | B2 * | 5/2019 | Leaders | G01N 29/4436 |
| 10,300,517 | B2 * | 5/2019 | Schulte | B21C 51/00 |
| 11,187,365 | B2 * | 11/2021 | Lapierre | F16L 41/12 |
| 11,841,222 | B1 * | 12/2023 | Bouzguenda | G01B 5/25 |
| 11,874,108 | B2 * | 1/2024 | Shaw | G01B 5/0004 |
| 12,000,517 | B2 * | 6/2024 | Greer, Jr. | F16L 41/04 |
| 2020/0263971 | A1 * | 8/2020 | Lyer | G01B 5/25 |
| 2023/0204131 | A1 * | 6/2023 | Ohnemus | F16L 3/1016 |
| | | | | 248/74.4 |
| 2023/0220958 | A1 * | 7/2023 | Chang | F17D 5/00 |
| | | | | 702/34 |
| 2024/0139841 | A1 * | 5/2024 | Oswald | B23D 79/12 |
| 2025/0074010 | A1 * | 3/2025 | Jones, III | B29C 66/5223 |

\* cited by examiner

CLAMP-ON TYPE PIPELINE MEASURING DEVICES AND FIXING STRUCTURES OF THE SAME

CROSS-REFERENCE TO RELATED APPLICATION

This application claims the priority of Taiwanese patent application No. 111119735, filed on May 26, 2022, which is incorporated herewith by reference.

BACKGROUND OF THE INVENTION

1. Field of the Invention

The present invention relates generally to a fixing structure of a measuring device, and more particularly, to a clamp-on type pipeline measuring device and a fixing structure of the same.

2. The Prior Arts

Full-time measuring state of pipelines and materials transported therein is necessary for many industries. Distinguished by installation methods, pipeline measuring devices include embedded type and clamp-on type. The embedded type pipeline measuring device (such as, electromagnetic flow meter) provides higher accuracy, but its installation time period is limited and its installation cost is high. On the other hand, the clamp-on type pipeline measuring device (such as, time-difference ultrasonic flow meter) has lower accuracy, but it has advantages of planning/installation at any time and lower installation cost, which have become the main trend of pipeline measuring technology.

FIG. 8A and FIG. 8B are radial schematic views of the clamps of the conventional clamp-on type pipeline measuring device. As shown in FIG. 8A, the clamp 8 of the conventional clamp-on type pipeline measuring device includes an upper clamp 81, a lower clamp 82, a screw 83, and a nut 84. The upper clamp 81 and the lower clamp 82 are fixed by the screw 83 with the nut 84 on the opposite sides of the outer surface of a pipeline 100. A carrier (not shown) equipped with sensing elements, such as ultrasonic probes, temperature sensors, and vibration sensors, is fixed to the upper clamp 81 or both the upper and lower clamps 81, 82 with screws. Since the same nominal pipe diameter, for example, 1½" pipe, has different reference outer diameters, for example, 48 to 50 mm, and tolerances, for example, ±0.15 to 0.4 mm, in different pipeline standards, when the clamp 8 clamps the pipeline, the radial dimension of the clamp 8 must reserve a residual. When the clamp-on type pipeline measuring device is installed on pipelines of different outer diameters, it is necessary to use screws 83 and nuts 84 to reduce the residual of the clamp 8, as shown by the dotted line in FIG. 8A, so as to fasten the clamp 8 and the pipelines 100, 100'. Then, the carrier and the clamp 8 are tightened with screws, so that a sensing surface of the sensing element can be attached to the outer surface of the pipeline 100, 100' of different outer diameters. As shown in FIG. 8B, in the process of fixing the clamp and the carrier, if the force applied by the screw is uneven or excessive, or the centerline of the carrier fixing mechanism of the clamp 8 and the axis of the pipeline 100, 100' are not parallel or not on the same plane, it is easy to cause the clamp 8 to be deflected or warped (e.g., one or both sides thereof are recessed along the pipeline direction), so that the sensing element in the carrier cannot be tightly attached to the outer surface of the pipeline or alignment of the sensing element is not accurate. In the process of fixing the carrier, due to the huge lever torque of the screw, if the force applied to the screw is uneven or excessive, it is also easy to cause the carrier to be deflected or warped. The poor installation of the clamp 8 and the carrier not only generates incorrect measuring data, but also damages the clamp-on type pipeline measuring device.

Even if the sensing element is not correctly installed on the outer surface of the pipeline, the existing clamp-on type pipeline measuring device usually still generates sensing signals and measuring data, so that users may not be able to detect errors in installation and measurement, which not only fails to achieve the purpose of full-time measuring, but also affects production costs and factory safety. Therefore, how to improve the convenience and correctness of installing the clamp-on type pipeline measuring device is the main objective of the present invention.

SUMMARY OF THE INVENTION

In order to achieve the foregoing objective, the present invention provides a fixing structure of a clamp-on type pipeline measuring device, including: a clamp and an aligning member; the clamp is detachably fixed on an outside surface of a pipeline along an axis of the outer surface of the pipeline, the aligning member is disposed in the clamp, wherein a plane tangent to the outer surface of the pipeline on the axis is defined as an installation datum plane. During detaching and fixing the clamp, the aligning member moves along a normal direction of the installation datum plane; after the clamp is fixed to the outer surface of the pipeline, the aligning member contacts at least two line segments on the outer surface of the pipeline, and distances between the two line segments and the installation datum plane are the same.

In an embodiment, the clamp includes a carrier and a buckle, the carrier is set on the installation datum plane, and the buckle surrounds the outer surface of the pipeline and connects to the carrier.

In an embodiment, the aligning member is arranged in the carrier, and a distance that the aligning member moves along the normal direction of the installation datum plane is proportional to a size of the outer diameter of the pipeline.

In an embodiment, the aligning member is arranged in the buckle, and a distance that the aligning member moves along the normal direction of the installation datum plane is inversely proportional to a size of the outer diameter of the pipeline.

In an embodiment, the fixing structure of the clamp-on type pipeline measuring device further includes an outer diameter measuring unit, which is arranged on the carrier, and the outer diameter measuring unit moves along the normal direction of the installation datum plane during the process of disassembling and fixing the buckle, and a distance that the outer diameter measuring unit moves along the normal direction of the installation datum plane is proportional to a size of the outer diameter of the pipeline.

In an embodiment, the aligning member includes a slider, the slider has two protruding arms, and a surface between the two arms is in the shape of a single angle, a polygon, a plane or an arc.

In an embodiment, the aligning member further includes an elastic member, and two ends of the elastic member are respectively embedded in the clamp and the slider, so as to generate an elastic force for moving the aligning member along the normal direction of the installation datum plane.

The present invention provides a clamp-on type pipeline measuring device, including a fixing structure and a sensing element, the fixing structure includes a clamp and an aligning member, wherein the clamp is detachably fixed on an outer surface of a pipeline, the aligning member is disposed in the clamp; the sensing element is arranged in the clamp and has a sensing surface; when the outer surface of the pipeline contacts the sensing surface, the clamp is fixed on the outer surface of the pipeline, the aligning member contacts at least two line segments of the outer surface of the pipeline, and the distances between the two line segments and the sensing surface are the same.

In an embodiment, the clamp includes a carrier and a buckle, and the aligning member is arranged in the carrier or the buckle.

In an embodiment, the sensing element is at least one of an ultrasonic probe, a temperature sensor, and a vibration sensor.

The fixing structure of the clamp-on type pipeline measuring device of the present invention includes a clamp and an aligning member, and the aligning member can be applied to pipelines with different pipe diameters, especially those with the same nominal pipe diameter and different pipeline specifications. In the process of fixing the clamp and the pipeline, the aligning member moves along the normal direction of the tangent plane passing through the axis of the outer surface of the pipeline, so that the center line of the clamp can be aligned with the axis of the outer surface of the pipeline. After fixing the clamp on the outer surface of the pipeline, the aligning member abuts at least two line segments equidistant from the outer surface of the pipeline and the installation datum plane, which can keep the clamp and the sensing element in the correct installation position, so that the sensing surface of the sensing element can be set on the tangent plane to the axis of the outer surface of the pipeline. The clamp-on type pipeline measuring device of the present invention reduces the use of screws to adjust the residual between the clamp and the pipeline, and effectively prevents the clamp, pipeline and sensing elements from shifting, warping, deforming and damage due to improper installation, improves the convenience of installation, and ensures the correctness of measurement.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention. Unless the context clearly indicates otherwise, terms herein include singular and plural forms, and the term "and/or" includes any and all combinations of one or more of the associated listed items.

Figure 1A:
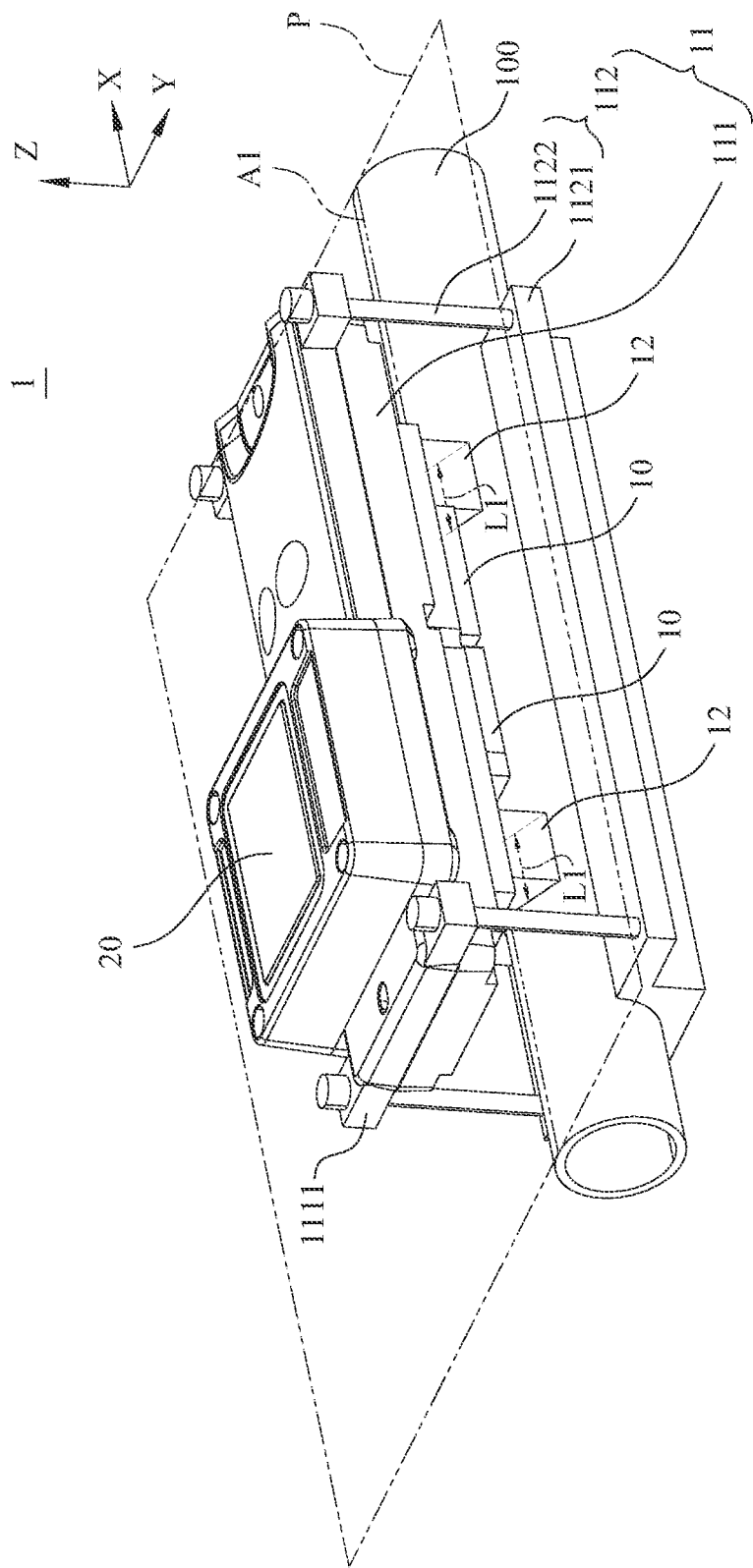
FIG. 1A is a side view of the fixing structure of the clamp-on type measuring device of a first embodiment of the present invention.
Figure 1B:
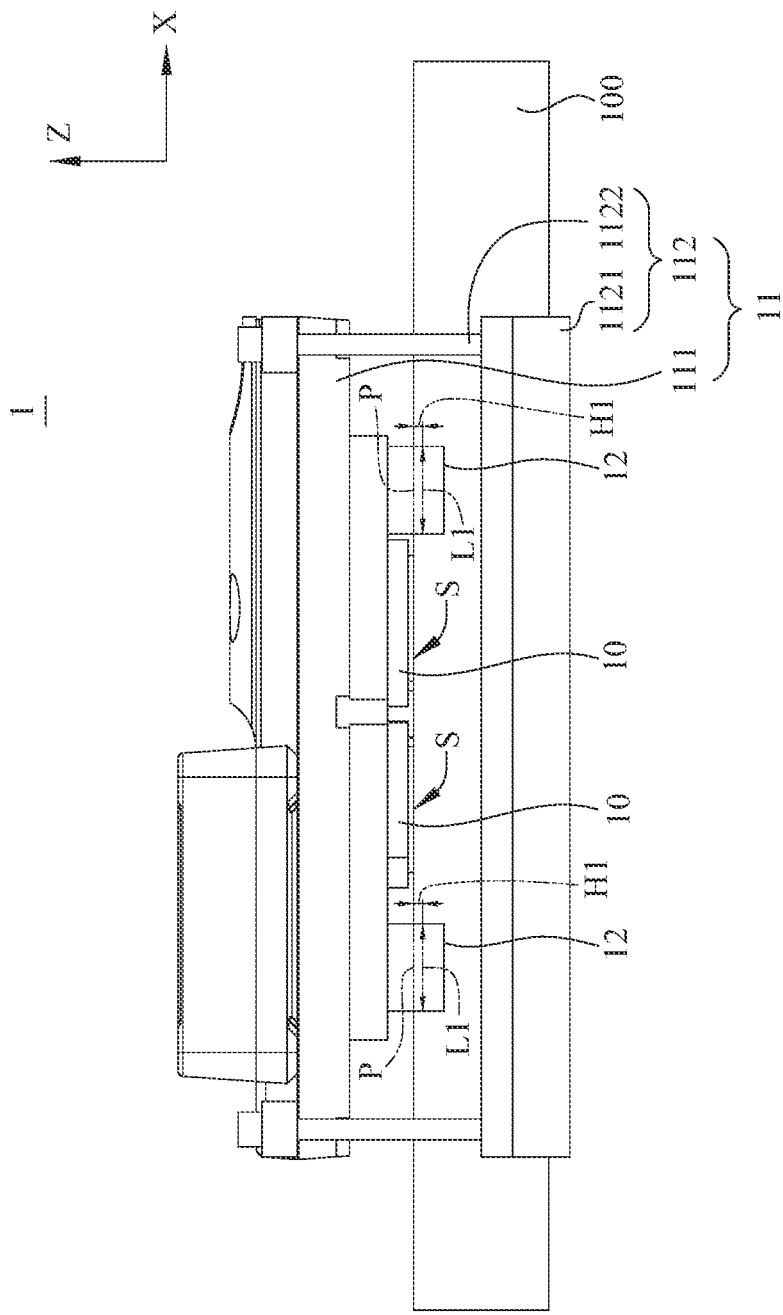
FIG. 1B is radial cross-sectional view of the fixing structure of the clamp-on type measuring device shown in FIG. 1A before fixed on the pipeline.
Figure 1C:
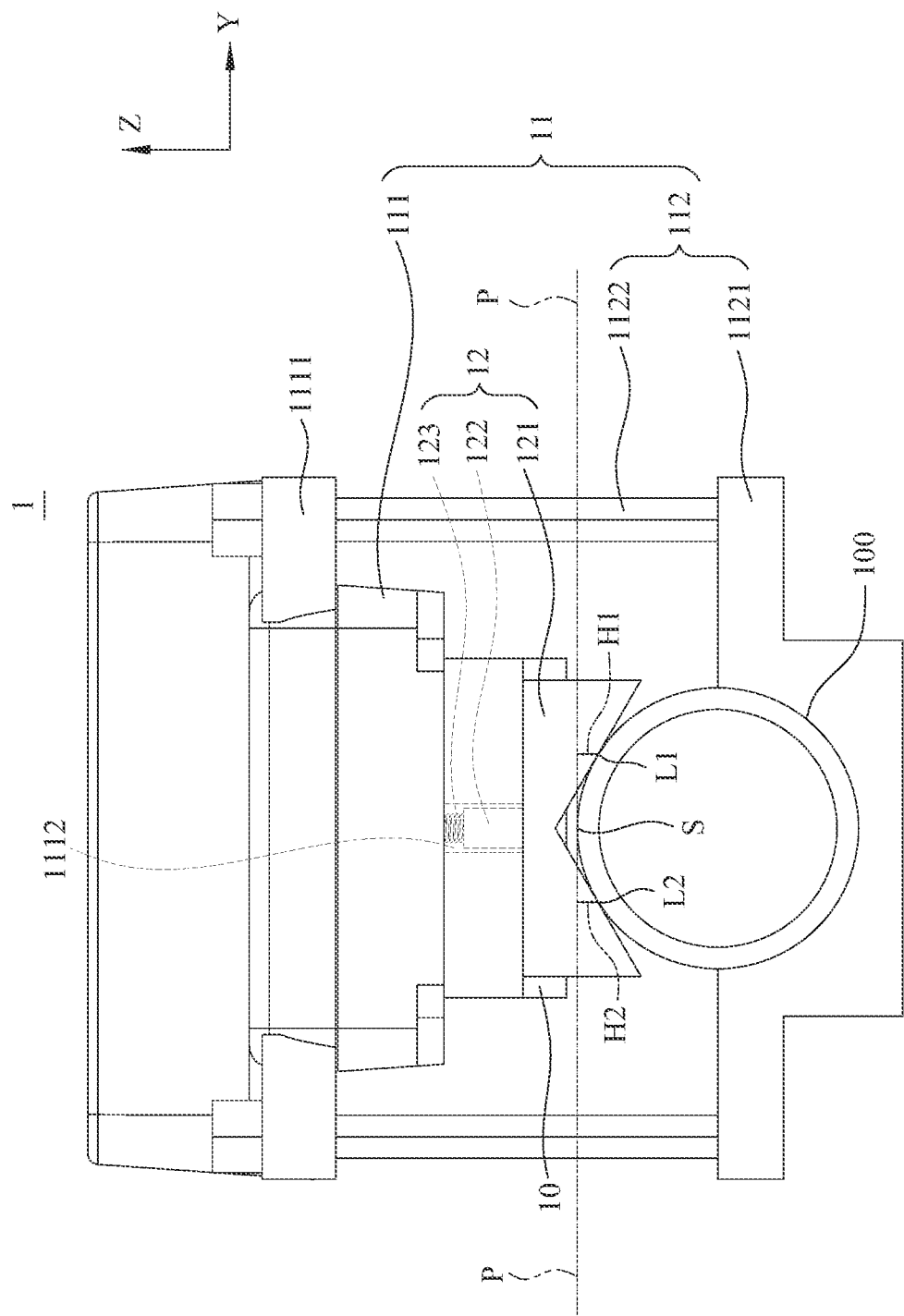
FIG. 1C is radial cross-sectional view of the fixing structure of the clamp-on type measuring device shown in FIG. 1A after fixed on the pipeline.

The outer surface of the pipeline is cylindrical, and the sensing surface of the sensing element of the clamp-on type pipeline measuring device is flat. Under the condition that the pipeline and the sensing element are not deformed, the correct installation position of the sensing surface of the clamp-on type pipeline measuring device is the tangent plane of the outer surface of the pipeline, and the sensing surface contacts an axis of the outer surface of the pipeline. FIG. 1A is a side view of the fixing structure of the clamp-on type measuring device of a first embodiment of the present invention; FIG. 1B is radial cross-section view of the fixing structure of the clamp-on type measuring device shown in FIG. 1A before fixed on the pipeline; FIG. 1C is radial cross-section view of the fixing structure of the clamp-on type measuring device shown in FIG. 1A after fixed on the pipeline. As shown in FIGS. 1A, 1B and 1C, the fixing structure 1 of the clamp-on type pipeline measuring device includes: a clamp 11 and an aligning member 12, the clamp 11 is detachably fixed on the outer surface of the pipeline 100 along the axis A1 (as X-axis direction shown in FIG. 1A) of the outer surface of the pipeline 100, and the aligning member 12 is disposed in the clamp 11, wherein the plane tangent to the axis A1 with the outer surface of the pipeline 100 is defined as the installation datum plane P (as the X-Y plane shown in FIG. 1A). During the processes of detaching and fixing the clamp 11, the aligning member 12 moves along the normal line of the installation datum plane P (as the Z-axis direction shown in FIG. 1A). After the clamp 11 is fixed on the outer surface of the pipeline 100, the aligning member 12 contacts at least two line segments L1, L2 on the outer surface of the pipeline 100, and the distances H1, H2 between the line segments L1, L2 and the installation datum plane P are the same.

In this embodiment, the clamp 11 includes a carrier 111 and a buckle 112. The carrier 111 can be made of plastic or alloy molding, is roughly rectangular, and can be equipped with a sensing element 10 and a processing circuit (not shown), a power supply (not shown), a display screen 20, etc. The sensing elements 10 can be ultrasonic probes, temperature sensors, vibration sensors, etc. The number of sensing elements 10 can be one or plural. The plurality of sensing elements 10 can be arranged in the carrier 111 along the long side direction of the carrier 111, and the two sides of the long side of the carrier 111 have a buckle seat 1111 and an aligning groove 1112. The buckle 112 includes an arc seat 1121 and a bolt 1122, can surround the outer surface of the pipeline 100, and connect the buckle seat 1111 of the carrier 111. The number of aligning members 12 can be one or plural; for example, a single aligning member 12 is arranged in the center of the long side of the carrier 111; two aligning members 12 can be arranged on the two sides of the long side of the carrier 111. The aligning member 12 includes a slider 121, a guide block 122, and an elastic member 123. A shape of the slider 121 is about "A", one end of the guide block 122 is connected to center of the slider 121, the other end of guide block 122 is embedded in the aligning groove 1112 located in the center of the short side of the carrier 111, and the two ends of the elastic member 123 (such as but not limited to a spring, leaf spring and rubber) are respectively connected to an inner wall of the aligning groove 1112 and the guide block 122. The elastic member 123 can generate an elastic force to move the slider 121 and a tensile force to prevent the slider 121 from moving out of the carrier 111. Depending on the outer diameter range of the pipeline 100, the aligning member 12 may move a distance of 0.1 mm to 10 cm in the aligning groove 1112 towards or away from the carrier 111.

The process of installing the clamp 11 on the outer surface of the pipeline 100 includes: placing the pipeline 100 on the arc seat 1121, placing the long side of the carrier 111 on the outer surface of the arc seat 1121 along the axial direction of the pipeline 100, so as to make the slider 121 of the aligning member 12 abut against the four line segments on the opposite sides of the axis A1 of the outer surface of the pipeline 100; screwing the bolt 1122 through the buckle seats 1111 on both sides of the carrier 111 into the screw hole of the arc seat 1121, to make the carrier 111 and the arc seat 1121 move towards each other to clamp the opposite sides of the outer surfaces of the pipeline 100, and concurrently to make the outer surface of the pipeline 100 push the aligning member 12 gradually moving toward the carrier 111 along the normal line vertical to the installation datum plane P (as the Z-axis direction shown in FIG. 1C). Since the elastic member 123 of the aligning member 12 is pressed to generate the elastic force that makes the slider 121 abut against the line segments L1 and L2 on the opposite sides of the outer surface of the pipeline 100 and the distance between the two line segments L1, L2 and the installation datum plane P be kept the same during the moving of the aligning member 12, so that the center line (the line connecting the center points of the two short sides of the bottom surface of the carrier) of the bottom surface of the carrier 111 (i.e., the surface of the carrier facing the pipeline is defined as the bottom surface of the carrier) can be aligned with the axis A1 of the outer surface of the pipeline 100 without deviation. When the bolt 1122 is screwed into the arc seat 1121 until the axis A1 of the outer surface of the pipeline 100 contacts the sensing surface S of the sensing element 10, and the clamp 11 will not move along the axis A1 of the pipeline 100 or rotate along the circumference of the pipeline 100, it means that the clamp 11 has been correctly fixed on the outer surface of the pipeline 100; that is, the centerline of the bottom surface of the carrier 111 is aligned with the axis A1 of the outer surface of the pipeline 100 and the sensing surface S of the sensing element 10 is set on the installation datum plane P.

Figure 1D:
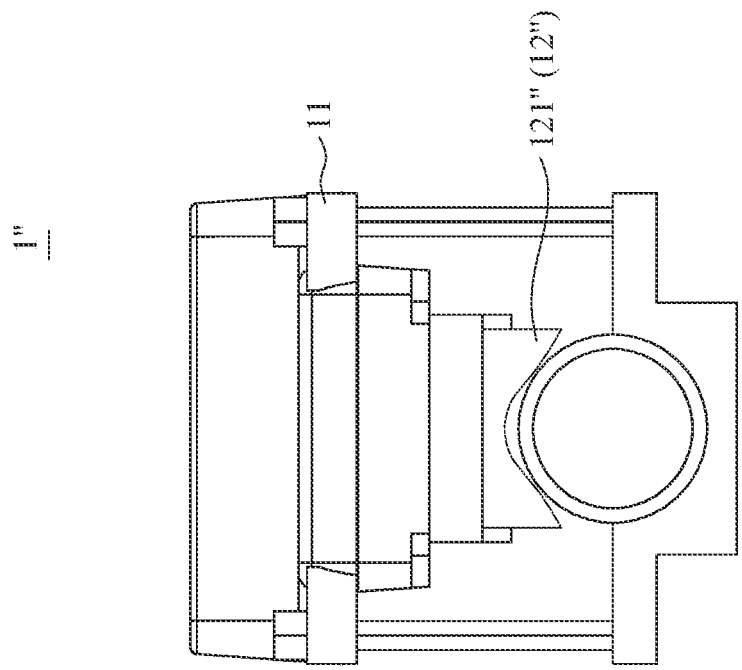
FIG. 1D is a radial schematic view of other aligning members of the first embodiment of the present invention.
Figure 1D:
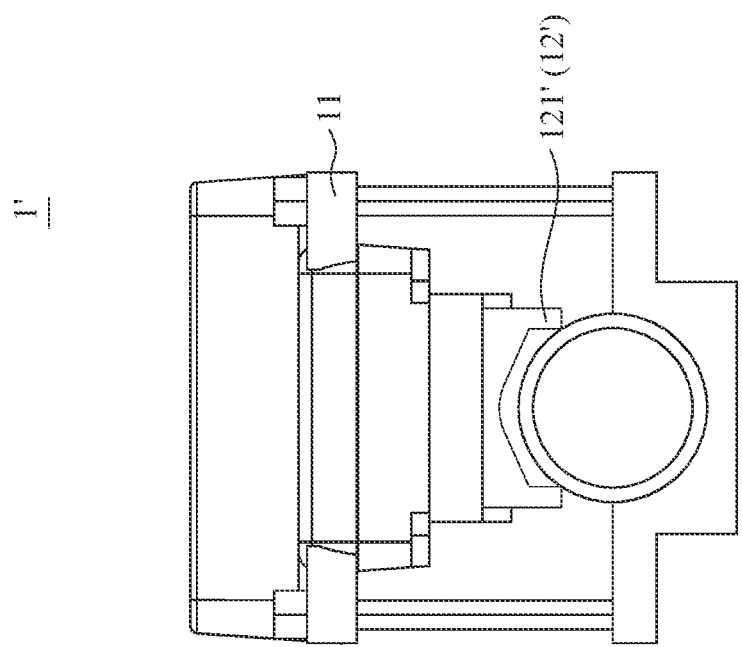

The main function of the aligning member is to move with the clamp and abut against at least two line segments on the outer surface of the pipeline during the processes of detaching and fixing. Therefore, the slider has two protruding arms, and the shape thereof is not limited to the A shape illustrated in the figure. The surface of the recess between the two arms can be single angle, polygon, plane or arc. FIG. 1D is a schematic radial view of other aligning members of the first embodiment. As shown in FIG. 1D, the fixing structure 1', 1" of the clamp-on type pipeline measuring device includes: a clamp 11 and aligning members 12', 12", and the slider 121' of the aligning member 12' is roughly arched in shape, the slider 121" of the aligning member 12" is roughly in the shape of an arch bridge, and the aligning members 12', 12" have the same functions and effects as the aforesaid aligning member 12.

Figure 2A:
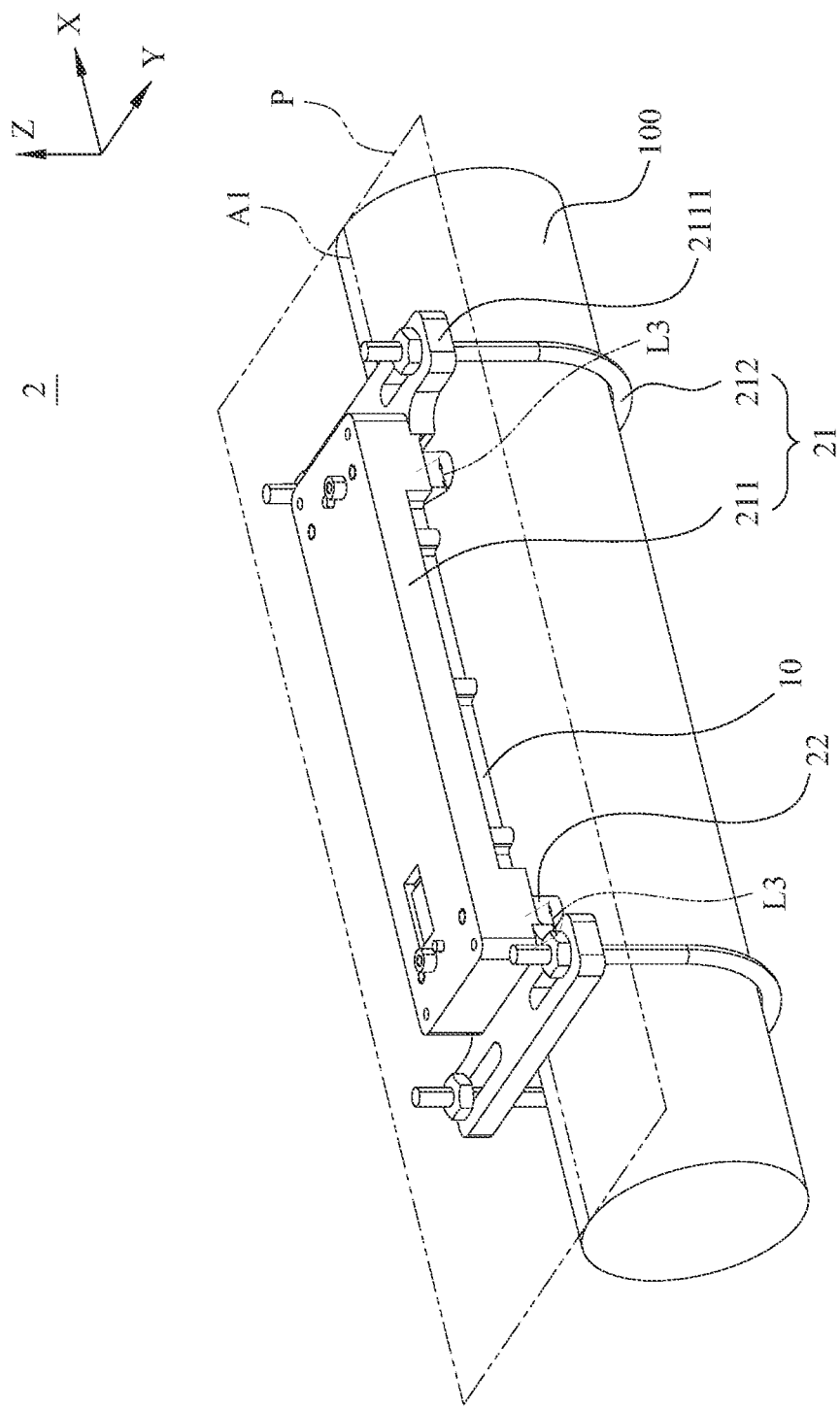
FIG. 2A is a side view of the fixing structure of the clamp-on type measuring device of a second embodiment of the present invention.
Figure 2B:
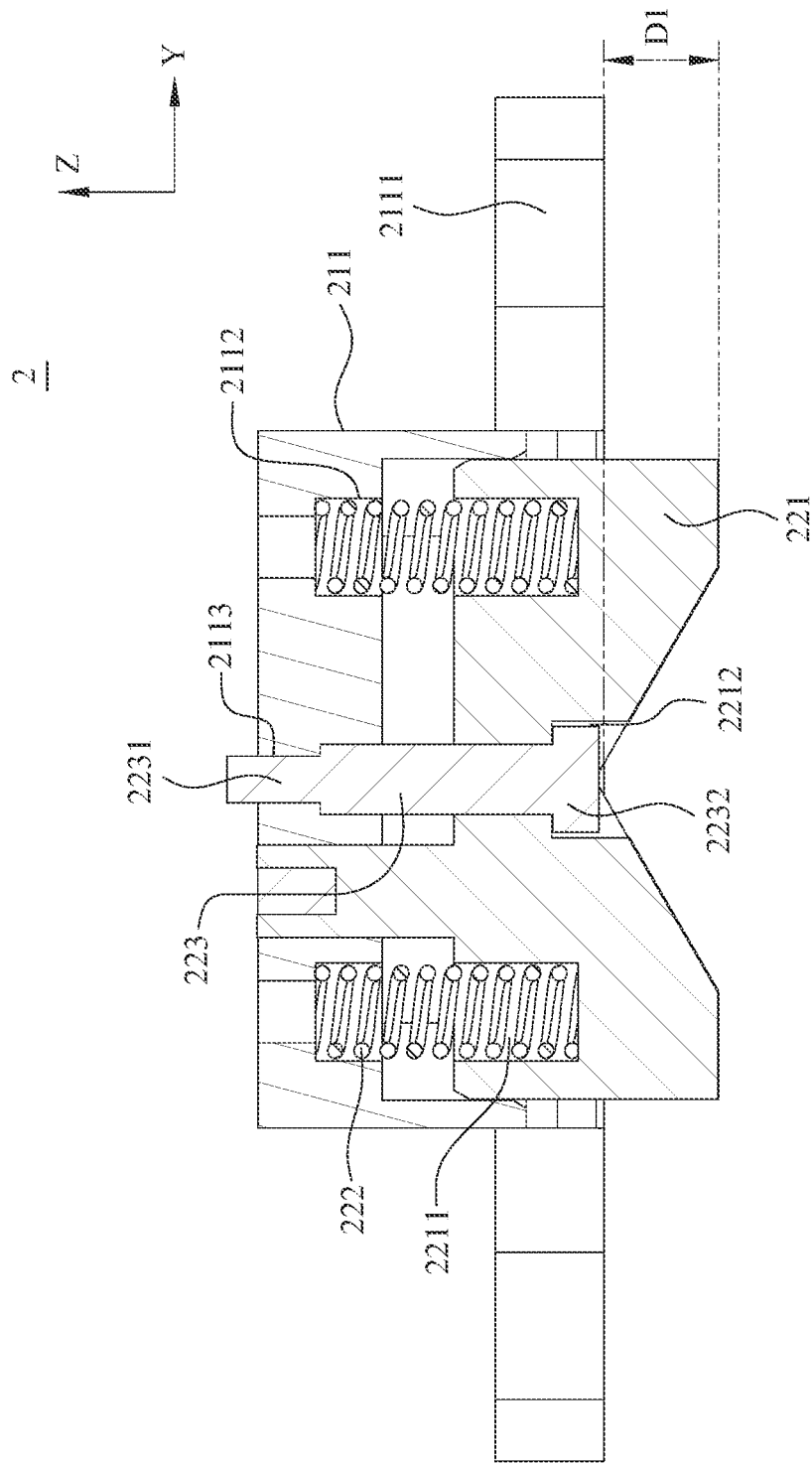
FIG. 2B is radial cross-sectional view of the fixing structure of the clamp-on type measuring device shown in FIG. 2A before fixed on the pipeline.
Figure 2C:
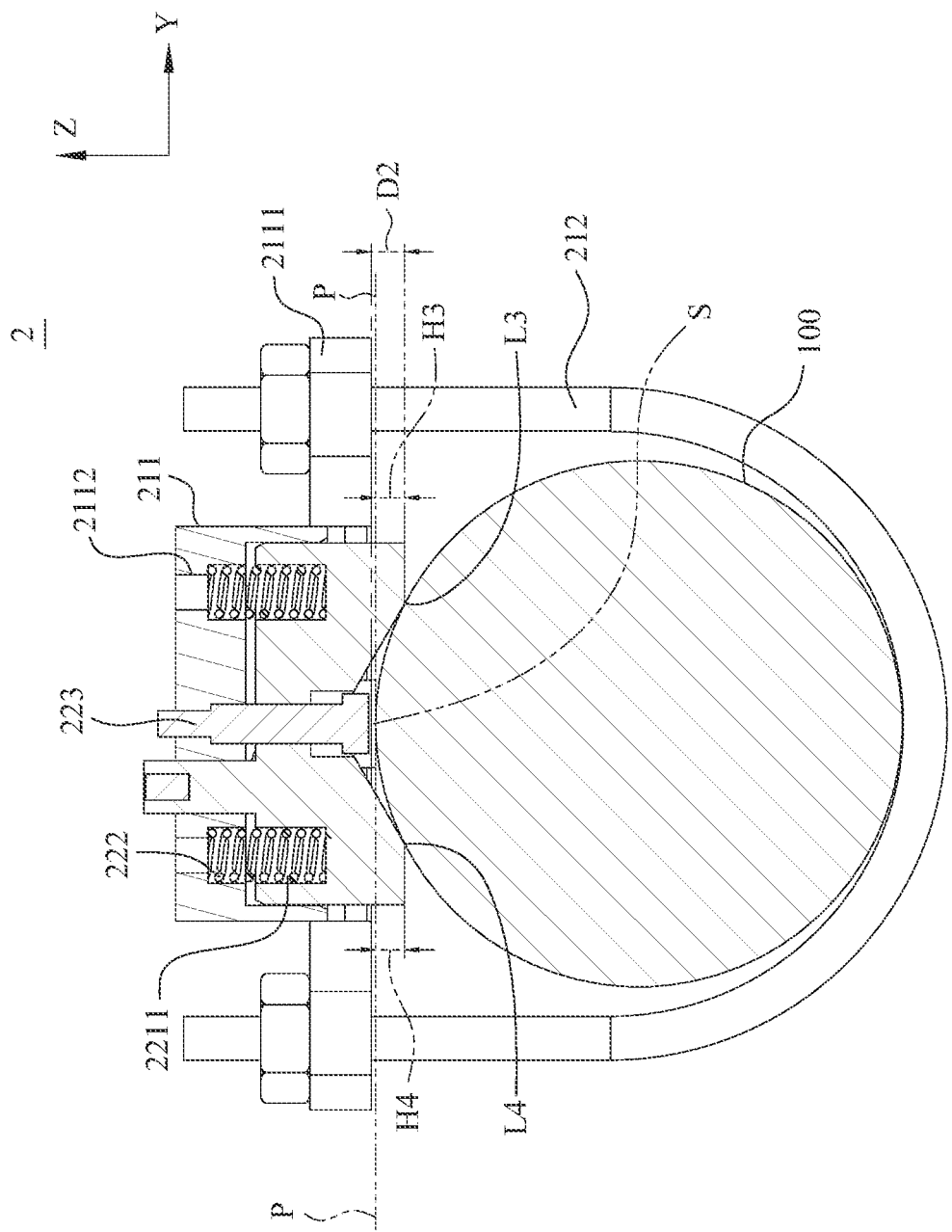
FIG. 2C is radial cross-sectional view of the fixing structure of the clamp-on type measuring device shown in FIG. 2A after fixed on the pipeline.

FIG. 2A is a side view of the fixing structure of the clamp-on type measuring device of a second embodiment of the present invention; FIG. 2B is radial cross-section view of the fixing structure of the clamp-on type measuring device shown in FIG. 2A before fixed on the pipeline; FIG. 2C is radial cross-section view of the fixing structure of the clamp-on type measuring device shown in FIG. 2A after fixed on the pipeline. As shown in FIGS. 2A, 2B and 2C, the fixing structure 2 of the clamp-on type pipeline measuring device includes: a clamp 21 and an aligning member 22, the clamp 21 is detachably fixed on the outer surface of the pipeline 100 along the axis A1 of the outer surface of the pipeline 100 (as X-axis direction shown in FIG. 2A), and the aligning member 22 is disposed in the clamp 21, wherein the plane tangent to the axis A1 with the outer surface of the pipeline 100 is defined as the installation datum plane P (as X-Y plane shown in FIG. 2A). After the clamp 21 is fixed on the outer surface of the pipeline 100, the aligning member 22 contacts at least two line segments L3, L4 on the outer surface of the pipeline 100, and the distances H3, H4 between the line segments L3, L4 and the installation datum plane P are the same.

In this embodiment, the clamp 21 includes a carrier 211 and a buckle 212, the carrier 211 can be made of plastic or alloy molding, the carrier 211 is roughly rectangular, and can be installed with the sensing element 10, the processing circuit (not shown), power supply (not shown), display screen (not shown), etc. The two sides of the long side of the carrier 211 have a buckle seat 2111, an aligning groove 2112, and a slot 2113, and the buckle 212 includes a U-shaped screws and nuts that can surround the outer surface of the pipeline 100 and connect the two sides of the long side of the carrier 211. Two aligning members 22 are arranged on the two sides of the long side of the carrier 211, and the aligning members 22 include sliders 221, elastic members 222, and stop blocks 223. The slider 221 is roughly in the shape of A, the center of the A shape is aligned with the center point of the short side of the carrier 211, and the two arms of the A shape form a receiving groove 2211. The two ends of the elastic member 222 are respectively embedded in the aligning groove 2112 and the receiving groove 2211. The elastic member 222 (such as, but not limited to spring, leaf spring, and rubber) can generate the elastic force to move the slider 221 and the resistance to keep the slider 221 in symmetrical contact with the two sides of the outer surface of the pipeline 100. A bottom end 2231 of the stop block 223 is fixed to the slot 2113 of the carrier 211, a top end 2232 of the stop block 223 is inserted into a chute 2212 in the center of the slider 221, and the surface of the top end 2232 is slightly recessed than the sensing surface S of the sensing element 10. When the slider 221 moves away from the carrier 211, the stop block 223 can prevent the aligning member 22 from moving out of the carrier 211. As shown in FIGS. 2B and 2C, when the clamp 21 is not fixed on the pipeline, the slider 221 protrudes from the bottom surface of the carrier 211 by a length D1; after the clamp 21 is fixed on the outer surface of the pipeline 100, the slider 211 protrudes from the bottom surface of the carrier 211 by a length D2; the distance (D1-D2) that the slider 221 moves toward or away from the carrier 211 along the normal direction of the installation datum plane P is between 0.1 mm and 10 cm.

Figure 2D:
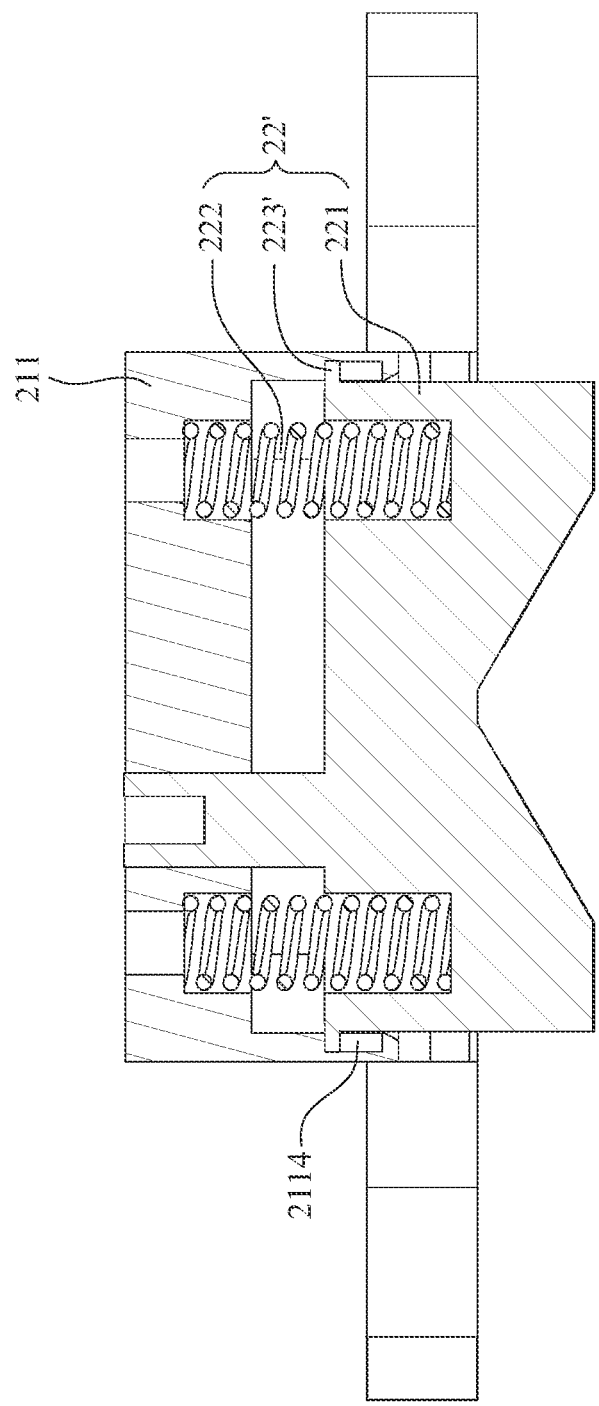
FIG. 2D is a radial schematic view of other aligning members of the second embodiment of the present invention.

The stop block of the aligning member is not limited to the above-mentioned forms. FIG. 2D is a radial schematic diagram of other aligning members according to the second embodiment of the present invention. As shown in FIG. 2D, the aligning member 22' includes a slider 221, an elastic member 222, and a stop block 223', and the inner wall of the carrier 211 for accommodating the aligning member 22' has a guide groove 2114, and the stop block 223' forms at the two side walls of the slider 221 and is inserted into the guide groove 2114. When the slider 221 moves away from the carrier 211, the stop block 223' can also stop the aligning member 22' from moving out of the carrier 211.

The process of installing the clamp 21 on the outer surface of the pipeline 100 includes: placing the long side of the carrier 211 on the outer surface of the pipeline 100 along the axial direction of the pipeline 100, so that the slider 221 of the aligning member 22 abuts the four line segments on the opposite sides of the axis A1 of the outer surface of the pipeline 100; using the U-shaped screw of the buckle 212 to surround the outer surface of the pipeline 100 and passes through the buckle seat 2111 of the carrier 211, and screwing the nut into the U-shaped screw to make the carrier 211 and the U-shaped screw move on opposite directions to clamp the outer surfaces of the two opposite sides of the pipeline 100, and concurrently to drive the outer surface of the pipeline 100 to push the aligning member 22 to gradually move toward the carrier 211 along the normal direction perpendicular to the installation datum plane P (as Z-axis direction shown in FIG. 2C). Since the slider 221 of the aligning member 22 abuts against the line segments L3 and L4 on both sides of the axis A1 of the outer surface of the pipeline 100, and keeps the same distance from the installation datum plane P during the moving of the aligning member 22, so that the center line of the bottom surface of the carrier 211 can be aligned with the axis A1 of the outer surface of the pipeline 100 without deviation. When the nut is screwed onto the U-shaped screw until the axis A1 of the outer surface of the pipeline 100 contacts the sensing surface S of the sensing element 10, and the clamp 21 does not move along the axial direction of the pipeline 100 or rotate along the circumference of the pipeline 100, it means that the clamp 21 has been correctly fixed on the outer surface of the pipeline 100; that is, the center line of the bottom surface of the carrier 211 is aligned with the outer surface of the pipeline 100 axis A1 and the sensing surface S of the sensing element 10 is set on the installation datum plane P. Compared with the structure in which the carrier and the clamp are separated in the prior art, the carrier 211 of the present embodiment is a part of the clamp 21, which reduces the screw-residual structure that will cause deformation of the carrier or clamp, and greatly reduces the possibility of installation failure and device failure.

In the process of fixing the clamp 21 and the pipeline 100, since the slider 221 of the aligning member 22 is firstly placed on the outer surface of the pipeline 100, the smaller the outer diameter of the pipeline is, the closer the outer surface of the pipeline 100 in contact with the A shape center of the slider 221 is, and the distance that the sensing surface S of the sensing element 10 moves to the outer surface of the pipeline 100 for fixing the clamp 21 is shorter. On the other hand, the larger the outer diameter of the pipeline 100 is, the closer the outer surface of the pipeline 100 in contact with the A shape opening of the slider 221 is, and the distance that the sensing surface S of the sensing element 10 moves to the outer surface of the pipeline 100 for fixing the clamp 21 will be longer. Therefore, the distance (D1-D2) that the aligning member 22 of the embodiment moves along the normal direction of the installation datum plane P during the installation of the clamp 21 is proportional to a size of the outer diameter of the pipeline 100.

Figure 3A:
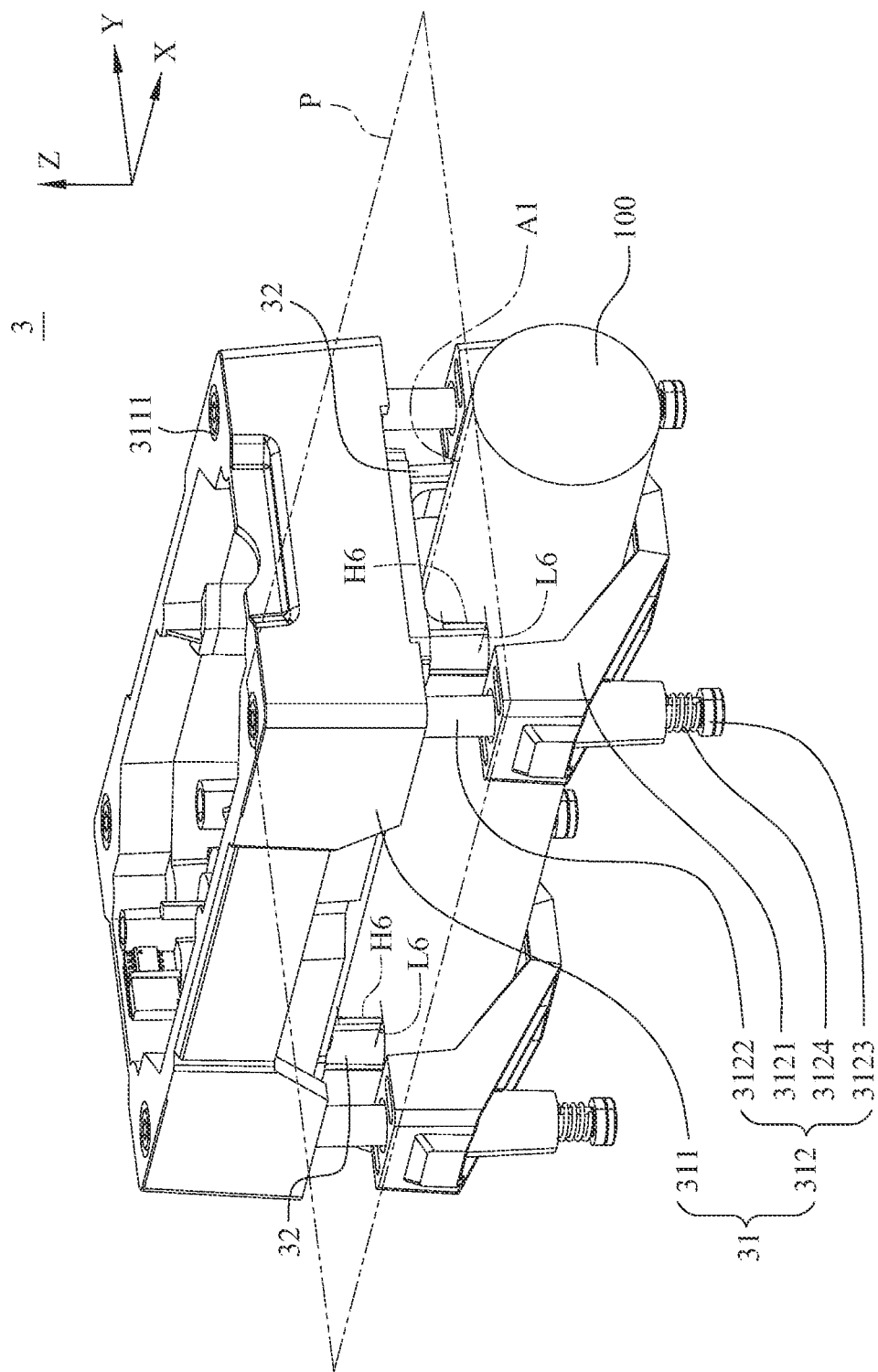
FIG. 3A is a side view of the fixing structure of the clamp-on type measuring device of a third embodiment of the present invention.
Figure 3B:
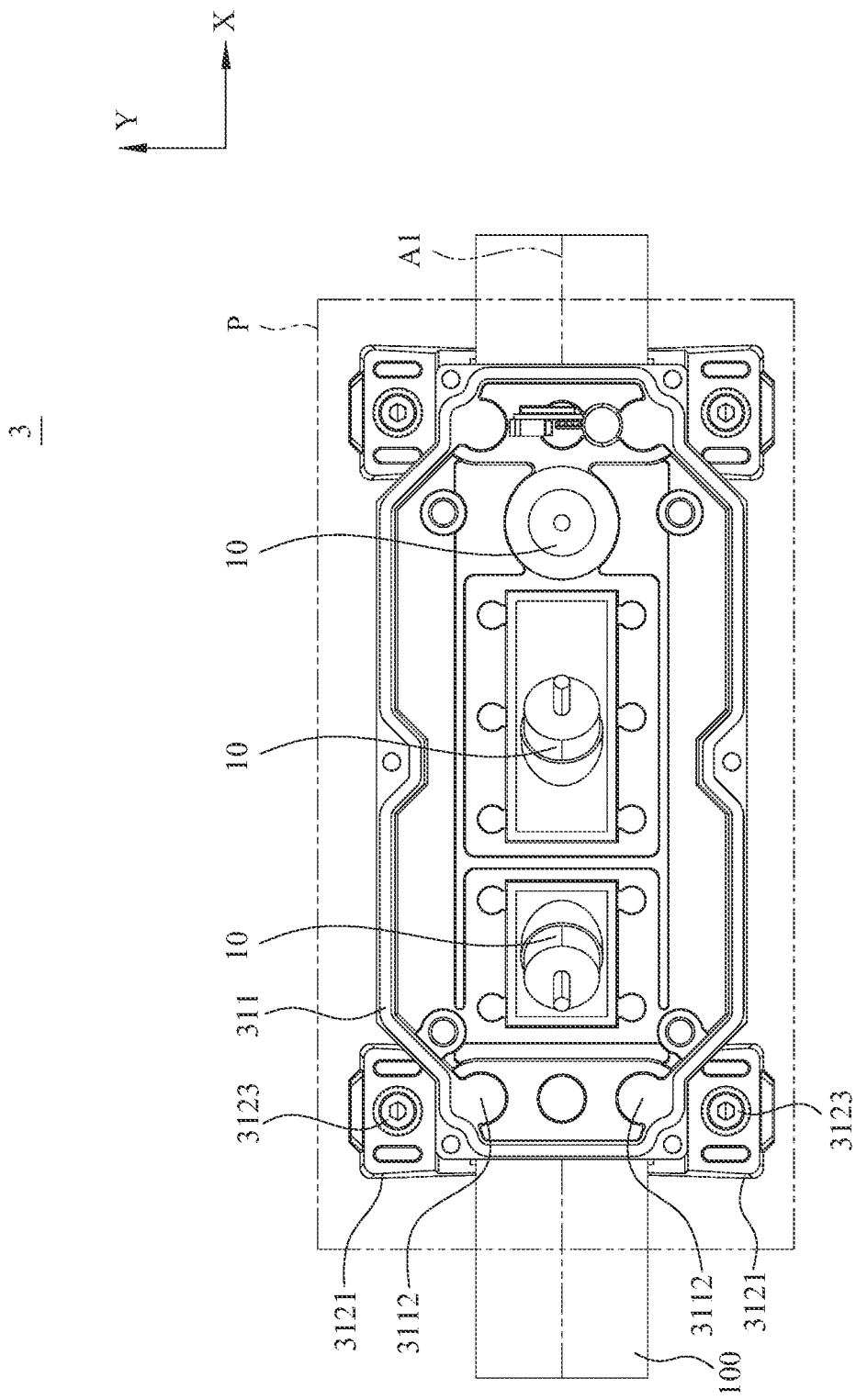
FIG. 3B is a top cross-sectional view of the other aligning members shown in FIG. 3A.
Figure 3C:
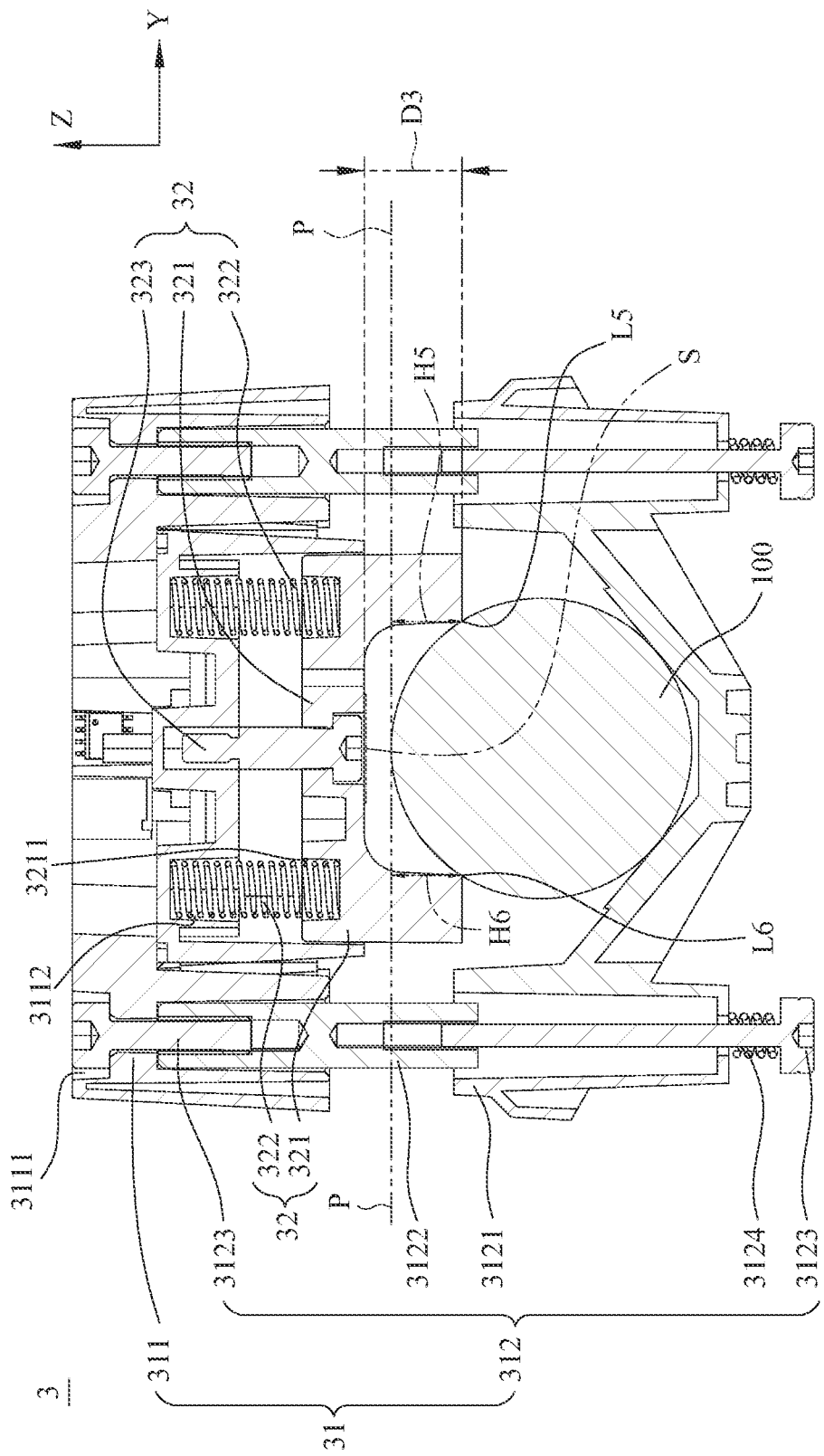
FIG. 3C is radial cross-section view of the fixing structure of the clamp-on type measuring device shown in FIG. 3A before fixed on the pipeline.
Figure 3D:
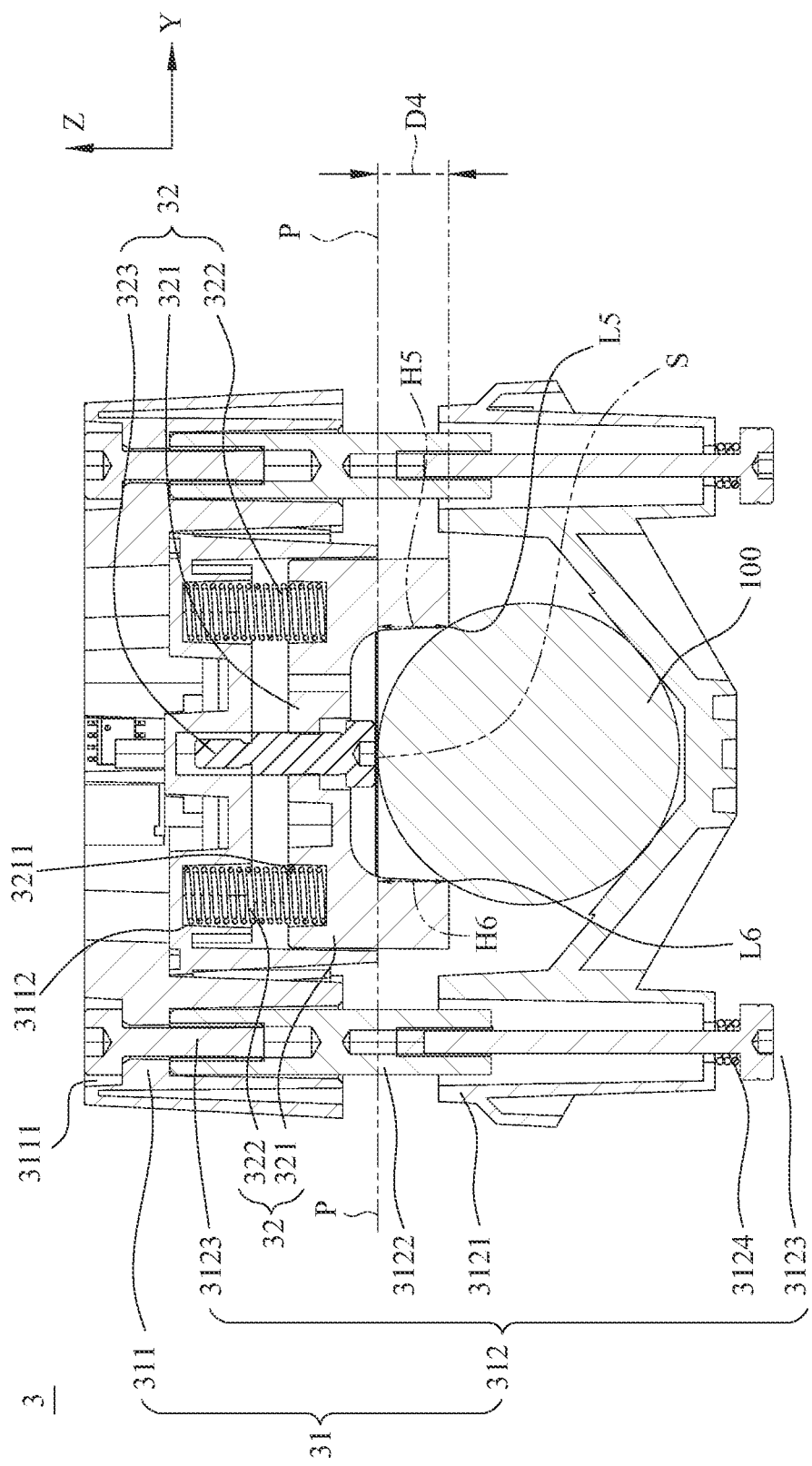
FIG. 3D is radial cross-sectional view of the fixing structure of the clamp-on type measuring device shown in FIG. 3A after fixed on the pipeline.

FIG. 3A is a side view of the fixing structure of the clamp-on type measuring device of a third embodiment of the present invention; FIG. 3B is a top cross-sectional view of the other aligning members shown in FIG. 3A; FIG. 3C is radial cross-section view of the fixing structure of the clamp-on type measuring device shown in FIG. 3A before fixed on the pipeline; FIG. 3D is radial cross-sectional view of the fixing structure of the clamp-on type measuring device shown in FIG. 3A after fixed on the pipeline. As shown in FIGS. 3A, 3B, 3C, and 3D, the fixing structure 3 of the clamp-on type pipeline measuring device includes: a clamp 31 and an aligning member 32, the clamp 31 is detachably fixed on the outer surface of the pipeline 100 along the axis A1 of the outer surface of the pipeline 100, and the aligning member 32 is disposed in the clamp 31, wherein the plane tangent to the axis A1 with the outer surface of the pipeline 100 is defined as the installation datum plane P. After the clamp 31 is fixed on the outer surface of the pipeline 100, the aligning member 32 contacts at least two line segments L5, L6 on the outer surface of the pipeline 100, and the distances H5, H6 between the line segments L5, L6 and the installation datum plane P are the same.

In this embodiment, the clamp 31 includes a carrier 311 and a buckle 312. The carrier 311 can be made of plastic or alloy molding. The carrier 311 can be made of plastic or alloy molding, is roughly rectangular, and can be equipped with a sensing element 10 and a processing circuit (not shown), a power supply (not shown), a display screen 20, etc. The sensing elements 10 can be ultrasonic probes, temperature sensors, vibration sensors, etc. The number of sensing elements 10 can be one or plural. The plurality of sensing elements 10 can be arranged in the carrier 311 along the long side direction of the carrier 311, and the two sides of the long side of the carrier 311 have a buckle seat 3111 and an aligning groove 3112. The buckle 312 include a polygonal seat 3121, a spiral tube 3122, a screw 3123, and an elastic member 3124, and can surround the outer surface of the pipeline 100 and connect to the buckle seat 3111 of the carrier 311. The polygonal seat 3121 is roughly M-shaped, the two arms of the M-shape have channels, and one side of the spiral tube 3122 is embedded in the channel of the polygonal seat 3121, and the inner walls of the two sides of the spiral tube 3122 have threads that can be engaged with the screws 3123. The screw 3123 can be, but not limited to, contour screw. The elastic member 3124, such as but not limited to spring, leaf spring, and rubber, is set between the polygonal seat 3121 and the screw 3123. Two aligning members 32 are arranged on both sides of the long side of the carrier 311, and the aligning member 32 includes a slider 321, an elastic member 322 and a stop block 323, and the slider 321 is roughly inverted U-shaped, the center of the inverted U-shape is aligned with the center point of the short side of the carrier 311, and an accommodating groove 3211 is formed in the two arms of the U-shape. The two ends of the elastic member 322 are respectively inserted into the aligning groove 3112 of the carrier 311 and the accommodating groove 3211 of slider 321. When the slider 321 moves away from the carrier 311, the stop block 323 can prevent the aligning member 32 from moving out of the carrier 311. As shown in FIGS. 3C and 3D, when the clamp 31 is not fixed on the pipeline, the slider 321 protrudes from the bottom surface of the carrier 311 by a length D3; after the clamp 31 is fixed on the outer surface of the pipeline 100, the slider 311 protrudes from the bottom surface of the carrier 311 by a length D4, and the distance (D3-D4) that the slider 321 moves toward or away from the carrier 311 along the normal direction of the installation datum plane P ranges from 0.1 mm to 10 cm.

The process of installing the clamp 31 on the outer surface of the pipeline 100 includes: passing the screw 3123 through the buckle seat 3111 of the carrier 311, placing the long side of the carrier 311 on the outer surface of the pipeline 100 along the axial direction of the pipeline 100 to make the slider 321 of the aligning member 32 abut against the four line segments on the opposite sides of the axis A1 of the outer surface of the pipeline 100; embedding the spiral tube 3122 into the channels of the two arms of the polygonal seat 3121, and using the polygonal seat 3121 and the spiral tube 3122 to surround the outer surface of the pipeline 100; screwing the screws 3123 respectively into the two sides of the spiral tube 3122 to make the elastic member 3124 push the polygonal seat 3121 and the carrier 311 to move toward each other and to clamp the outer surface of the two opposite sides of the pipeline 100, and concurrently to drive the outer surface of the pipeline 100 to push the aligning member 32 to gradually move toward the carrier 311 along the normal line vertical to the installation datum plane P (as Z-axis direction shown in FIG. 3C). Because the slider 321 of the aligning member 32 abuts against the two side segments L5, L6 of the axis A1 of the outer surface of the pipeline 100 and keeps the same distance from the installation datum plane P during the moving of the aligning member 32, the center line of the bottom surface of the carrier 311 can be aligned with the axis A1 of the outer surface of the pipeline 100 without deviation. When the screw 3123 is screwed until the axis A1 of the outer surface of the pipeline 100 contacts the sensing surface S of the sensing element 10, and the carrier 311 and the polygonal seat 3121 will not move along the axial direction of the pipeline 100 or rotate along the circumference of the pipeline 100, it means that the clamp 31 has been correctly fixed on the outer surface of the pipeline 100; that is, the centerline of the bottom surface of the carrier 311 is aligned with the axis A1 of the outer surface of the pipeline 100, and the sensing surface S of the sensing element 10 is set on the installation datum plane P.

In the process of fixing the clamp 31 and the pipeline 100, since the slider 321 of the aligning member 32 is first placed on the outer surface of the pipeline 100, the smaller the outer diameter of the pipeline is, the shorter the distance between the outer surface of the pipeline 100 and the sensing surface S of the sensing element 10 is, and the shorter the distance that the slider 321 moves to the fixing position will be. On the other hand, the larger the outer diameter of the pipeline 100 is, the longer the distance between the outer surface of the pipeline 100 and the sensing surface S of the sensing element 10 is, and the longer the distance that the slider 321 moves to the fixing position will be. Therefore, the distance (D1-D2) that the aligning member 22 of the embodiment moves along the normal direction of the installation datum plane P during the installation of the clamp 21 is proportional to a size of the outer diameter of the pipeline 100. It is worth noting that the inverted U-shaped design of the slider 321 in this embodiment can not only ensure the direction and sensitivity of the moving of the alignment member 32 along the normal line of the installation datum plane P during the process of fixing the clamp 31, but also effectively prevent the clamp 31 from rotating along the pipeline 100 during fixing.

Figure 4A:
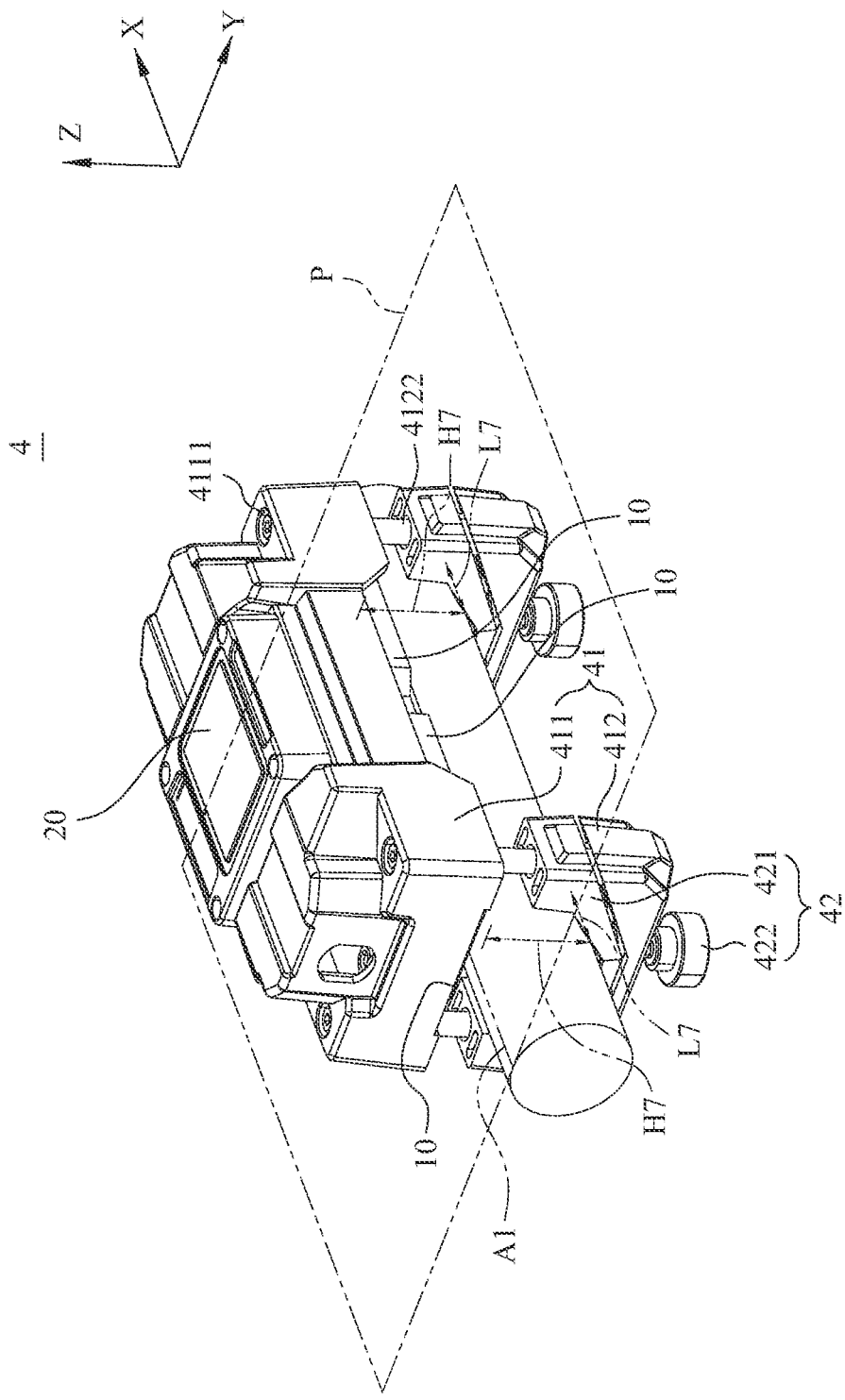
FIG. 4A is a side view of the fixing structure of the clamp-on type measuring device of a fourth embodiment of the present invention.
Figure 4B:
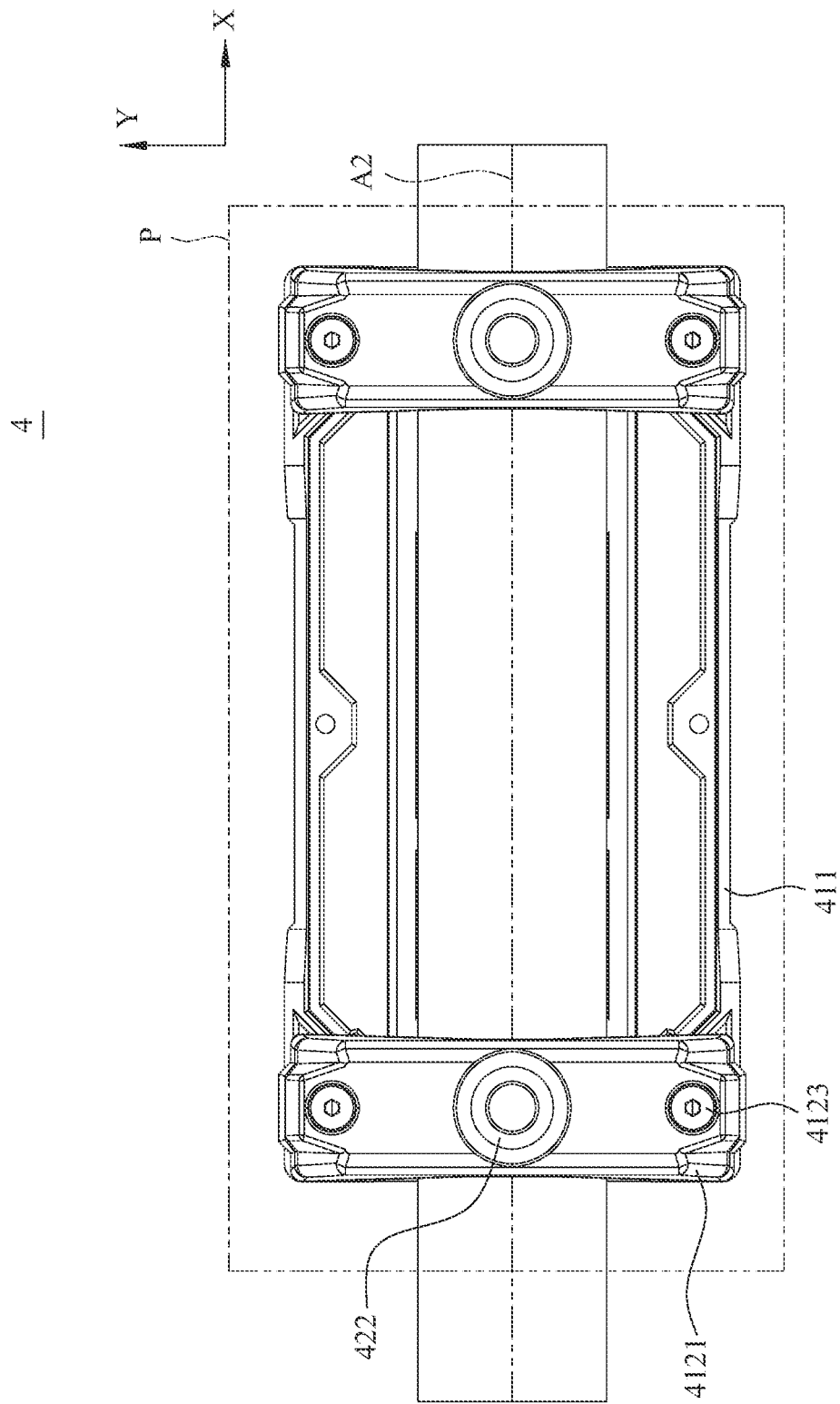
FIG. 4B is a bottom view of the other aligning members shown in FIG. 4A.
Figure 4C:
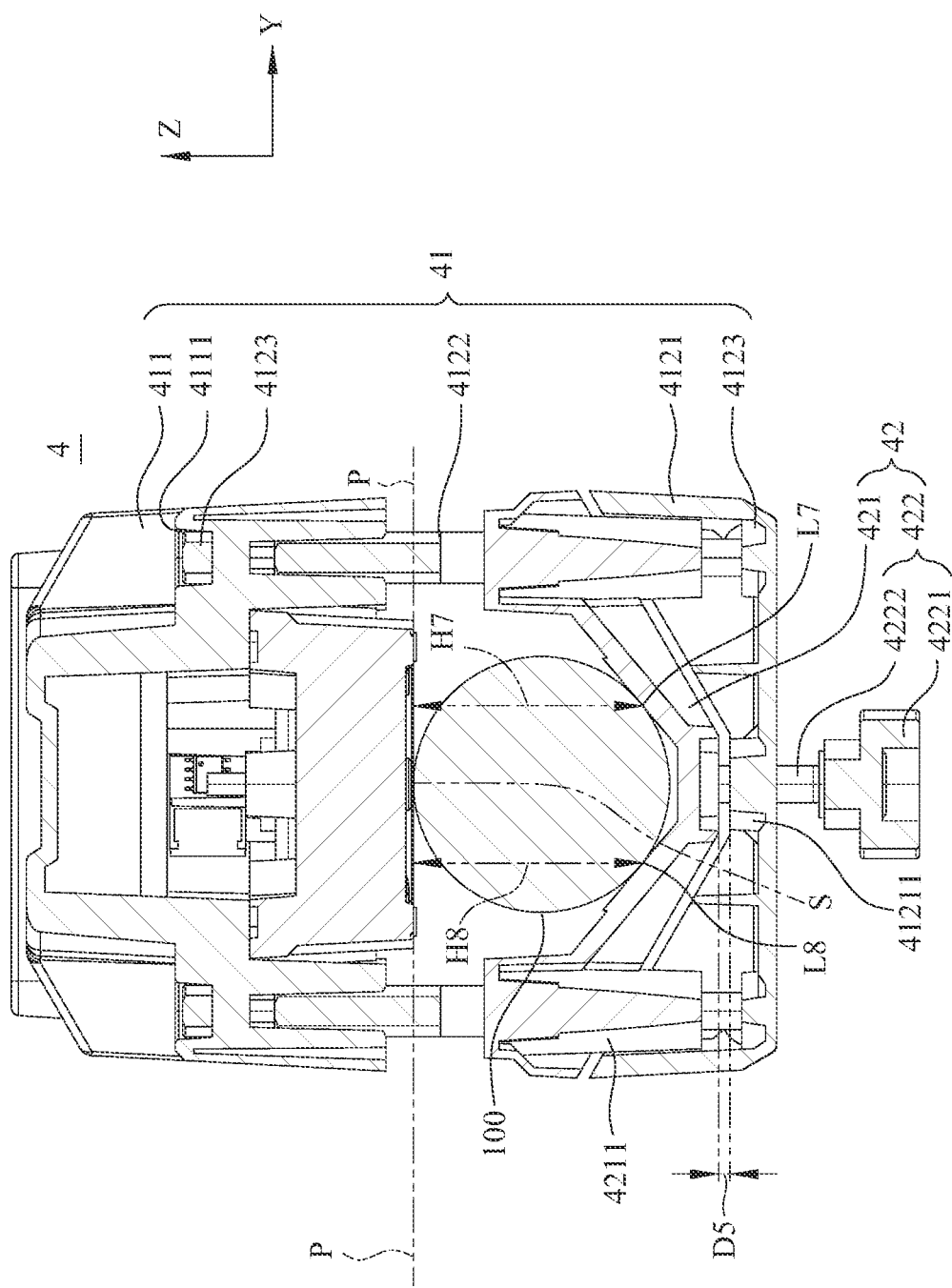
FIG. 4C is radial cross-section view of the fixing structure of the clamp-on type measuring device of FIG. 4A.

FIG. 4A is a side view of the fixing structure of the clamp-on type measuring device of a fourth embodiment of the present invention; FIG. 4B is a bottom view of the other aligning members shown in FIG. 4A; FIG. 4C is radial cross-sectional view of the fixing structure of the clamp-on type measuring device shown in FIG. 4A. As shown in FIGS. 4A, 4B and 4C, the fixing structure 4 of the clamp-on type pipeline measuring device includes: a clamp 41 and an aligning member 42, the clamp 41 is detachably fixed on the outer surface of the pipeline 100 along the axis A1 of the outer surface of the pipeline 100, and the aligning member 42 is disposed in the clamp 41, wherein the plane tangent to the axis A1 with the outer surface of the pipeline 100 is defined as the installation datum plane P. After the clamp 41 is fixed on the outer surface of the pipeline 100, the aligning member 42 contacts at least two line segments L7, L8 on the outer surface of the pipeline 100, and the distances H7, H8 between the line segments L7, L8 and the installation datum plane P are the same.

In this embodiment, the clamp 41 includes a carrier 411 and a buckle 412. The carrier 411 can be made of plastic or alloy molding. The carrier 411 is roughly rectangular, and can be equipped with a sensing element 10, a processing circuit (not shown), a power supply (not shown), a display screen 20, etc. The sensing elements 10 can be ultrasonic probes, temperature sensors, vibration sensors, etc. The number of sensing elements 10 can be one or plural. The plurality of sensing elements 10 can be arranged in the carrier 411 along the long side direction of the carrier 411, and the two sides of the long side of the carrier 411 have a buckle seat 4111.

The buckle 412 includes a base seat 4121, a spiral tube 4122, and a screw 4123, and can surround the outer surface of the pipeline 100 and connect to the buckle seat 4111 of the carrier 411. The base seat 4121 is an open shell, and a screw hole 41211 is formed in the center of the base seat 4121. The aligning member 42 is arranged on the base seat 4121 of the buckle 412, and includes a slider 421 and an adjusting member 422. The slider 421 is roughly M-shaped, and the center of the M shape is aligned with the center of the base seat 4121. The adjusting member 422 includes a knob 4221 and a threaded segment 4222. The knob 4221 is set on a side of the base seat 4121 opposite to the slider 421, the threaded segment 4222 passes through the screw hole 41211 of the base seat 4121 and connects to the M-shaped center of the slider 412. The two arms of the M-shape of the slider 421 have sliding groove 4211 for the spiral tubes 4122 and the screw 4123 pass therethrough, and the slider 421 can move toward or away from the carrier 411 along the spiral tube 4122 for a distance of 0.1 mm to 10 cm according to the outer diameter of the pipeline 100 required.

The process of installing the clamp 41 on the outer surface of the pipeline 100 includes: placing the carrier 411 and the buckle 412 on opposite sides of the outer surface of the pipeline 100, aligning the axis A2 of the outer surface of the pipeline 100 with the center of the base seat 4121, placing the pipeline 100 on the slider 421 of the aligning member 42, wherein the axes A1 and A2 of the outer surface of the pipeline 100 are located on the same semicircular section of the pipeline 100; screwing the screws 4123 respectively to pass through the buckle 4111 and the through hole of the base seat 4121 then into the two sides of the spiral tube 4122 to fix the carrier 411 and the buckle 412; rotating the adjusting member 422 to make the slider 421 gradually move toward the carrier 411 along the normal direction of the spiral tube 4122 (perpendicular to the installation datum plane P, as the Z-axis direction shown in FIG. 4C) and to push the axis A1 of the outer surface of the pipeline 100 against the sensing surface S of the sensing element 10. When the clamp 41 does not move axially along the pipeline 100 or rotate along the circumference of the pipeline 100, it means that the clamp 41 has been correctly fixed on the outer surface of the pipeline 100; that is, the centerline of the bottom surface of the carrier 411 is aligned with the axis A1 of the outer surface of the pipeline 100 and the sensing surface S of the sensing element 10 is set on the installation datum plane P.

In the process of fixing the clamp 41 and the pipeline 100, since the pipeline 100 is first placed on the slider 421 of the aligning member 42, the smaller the outer diameter of the pipeline is, the longer the distance between the outer surface of the pipeline 100 and the sensing surface S of the sensing element 10 is, and the longer the distance that the slider 421 pushes the pipeline 100 to the fixing position will be. On the other hand, the larger the outer diameter of the pipeline 100 is, the shorter the distance between the outer surface of the pipeline 100 and the sensing surface S of the sensing element 10 is, and the shorter the distance that the slider 421 pushes the pipeline 100 to the fixing position will be.

Using the length D5 between starting point of the slider 421 movement and the fixed position of fixing the pipeline 100 as the distance that the aligning member 42 moves along the normal direction of the installation datum plane P during the installation of the clamp 41, the distance (D5) that the aligning member 42 moves along the normal direction of the installation datum plane P during the installation of the clamp 41 is inversely proportional to a size of the outer diameter of the pipeline 100. It is worth noting that when the carrier 411 and the buckle 412 are fixed by the spiral tube 4122 and the screw 4123, the carrier 411 and the buckle 412 will not squeeze the pipeline 100. By using the slider 421 made of a material in mechanical strength weaker than that of the pipeline 100 and the carrier 411, to fix the clamp 41 and the pipeline 100 with the aligning member 42 abutting against the two sides of the outer surface of the pipeline 100, even when the applied force is too large, the buckle 412 will only be enlarged to ensure that the carrier 411 and the buckle 412 will not squeeze the pipeline 100, and the adjusting member 422 exerts a force on the center point of the slider 421, so that uneven application of force does not occur, and shifting, warping or deforming of the clamp 41 and the pipeline 100 can be prevented.

Figure 5A:
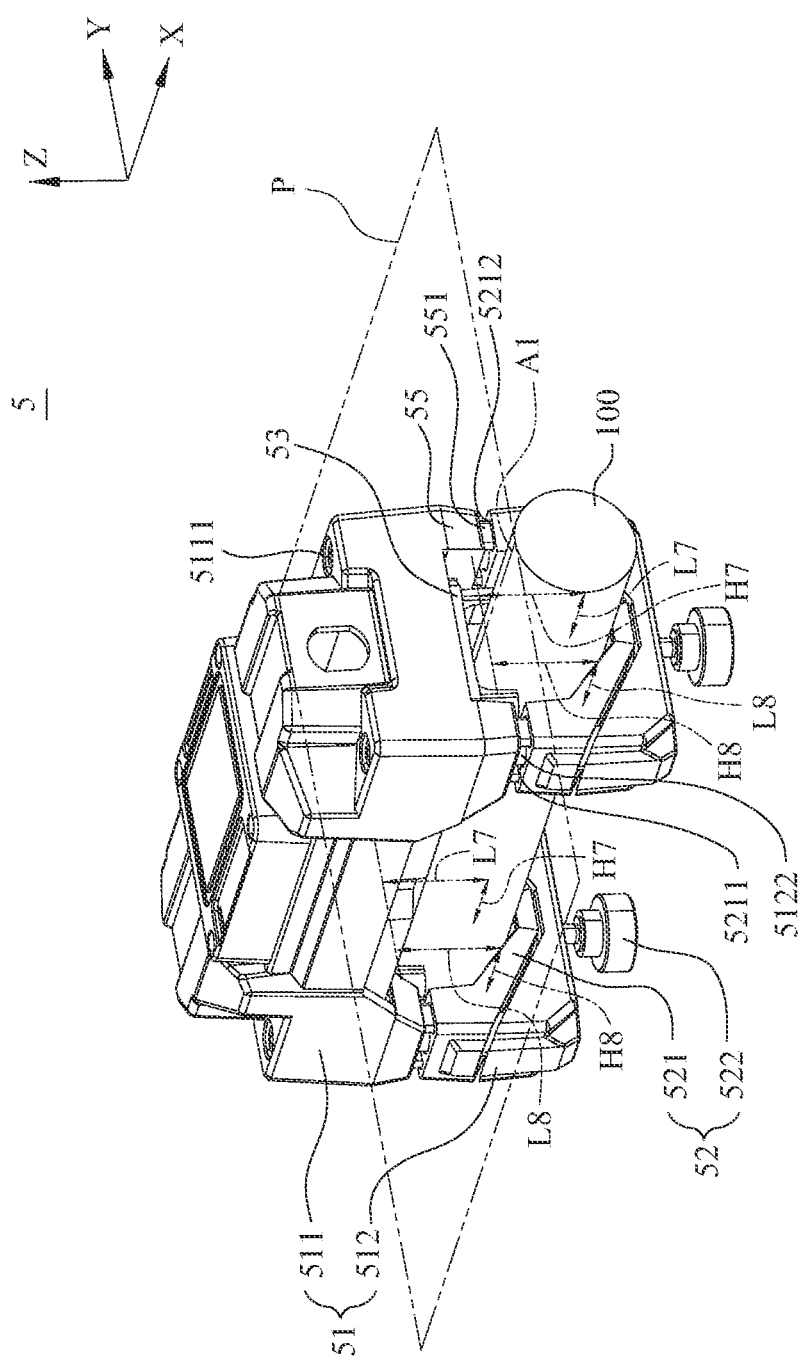
FIG. 5A is a side view of the fixing structure of the clamp-on type measuring device of a fifth embodiment of the present invention.
Figure 5B:
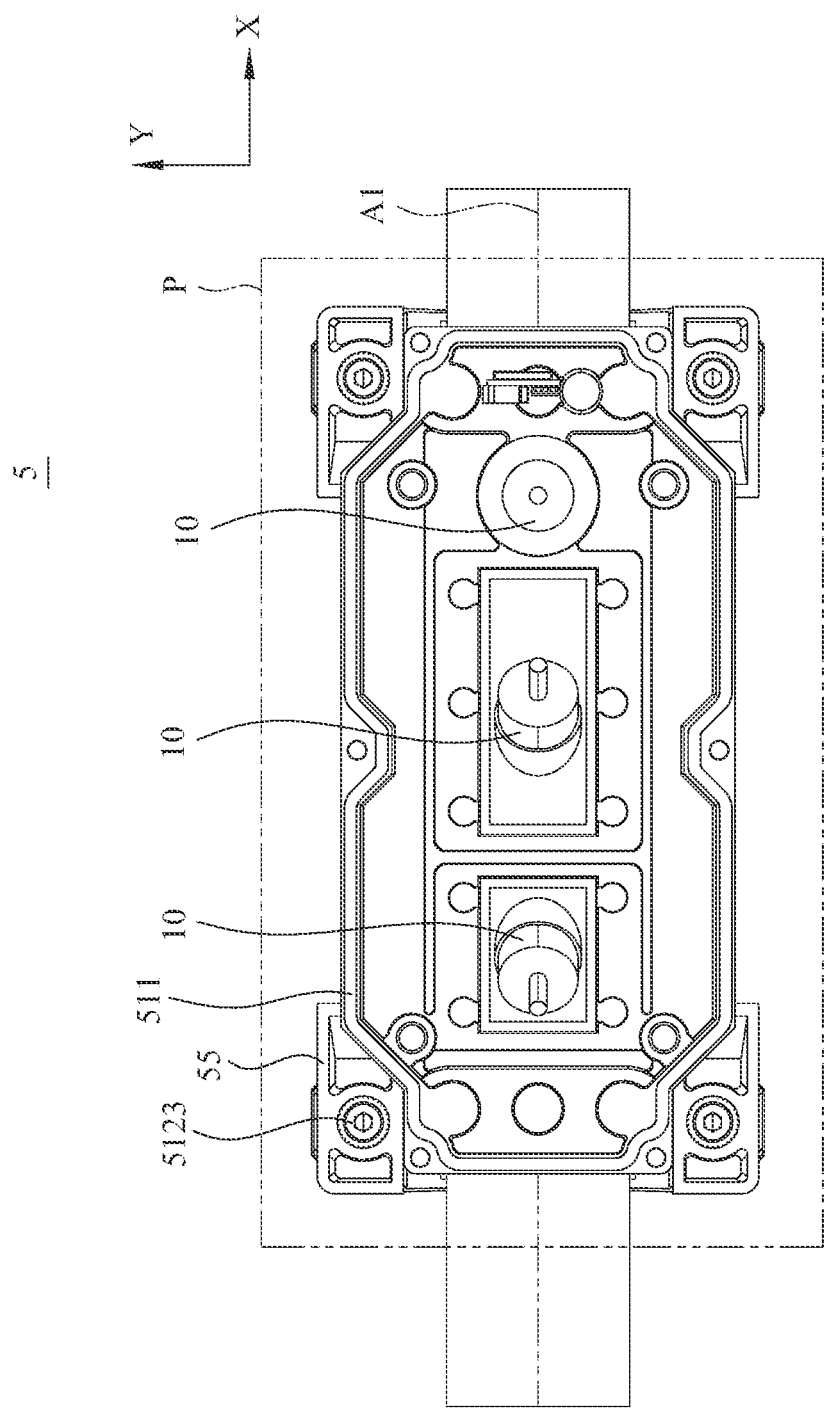
FIG. 5B is a top view of the other aligning members shown in FIG. 5A.
Figure 5C:
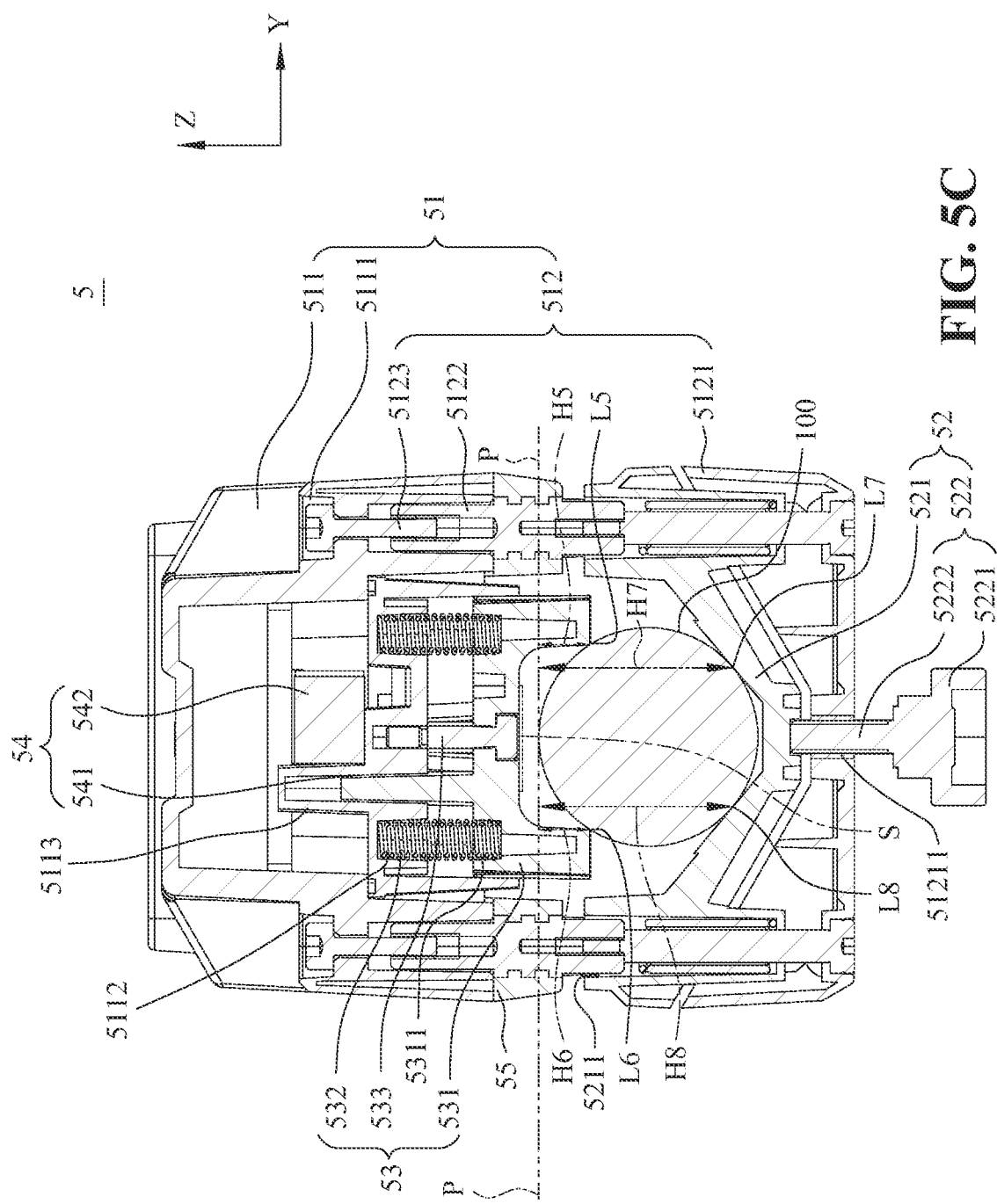
FIG. 5C is radial cross-sectional view of the fixing structure of the clamp-on type measuring device shown in FIG. 5A before fixed on the pipeline.
Figure 5D:
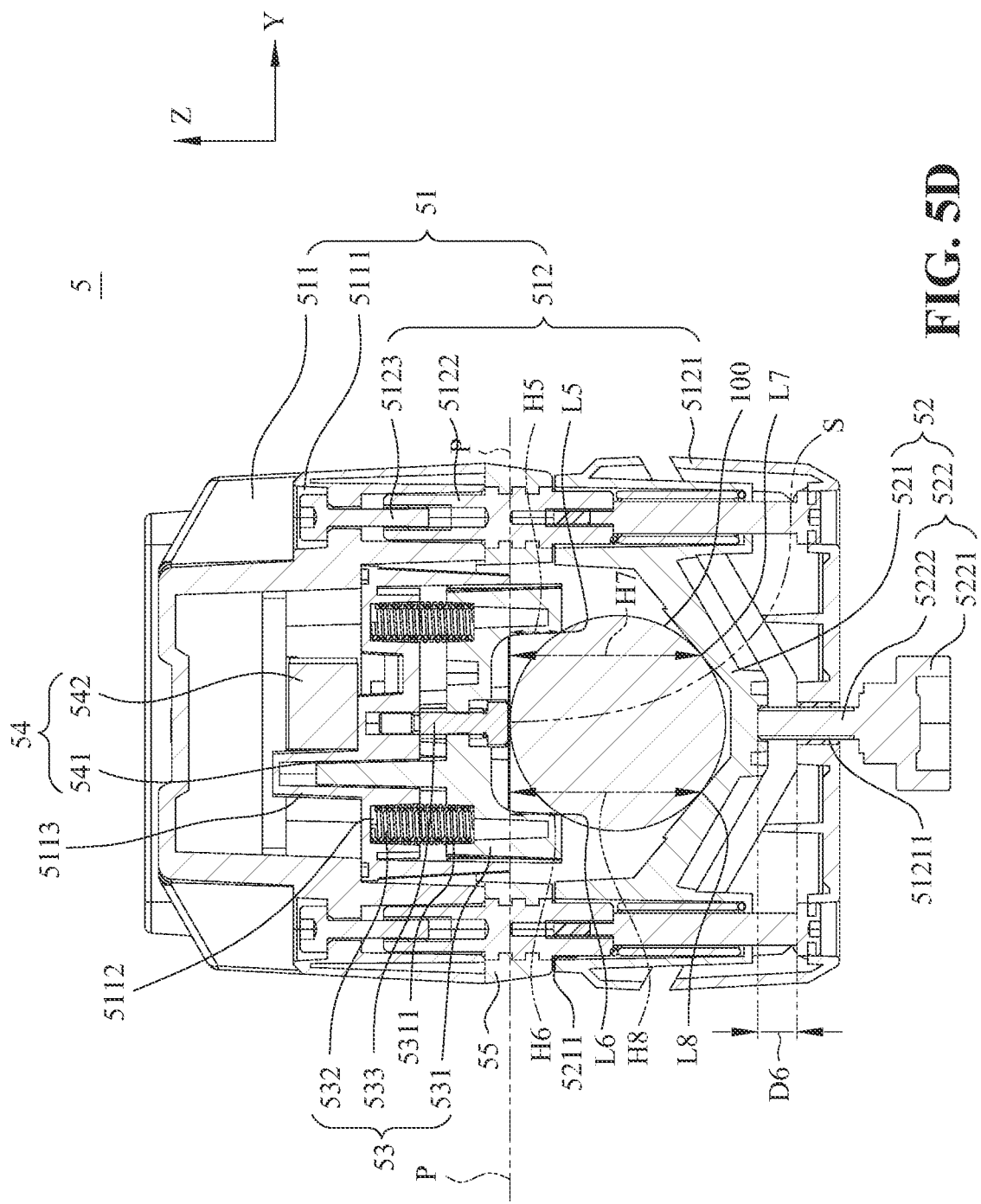
FIG. 5D is radial cross-sectional view of the fixing structure of the clamp-on type measuring device shown in FIG. 5A after fixed on the pipeline.
Figure 5E:
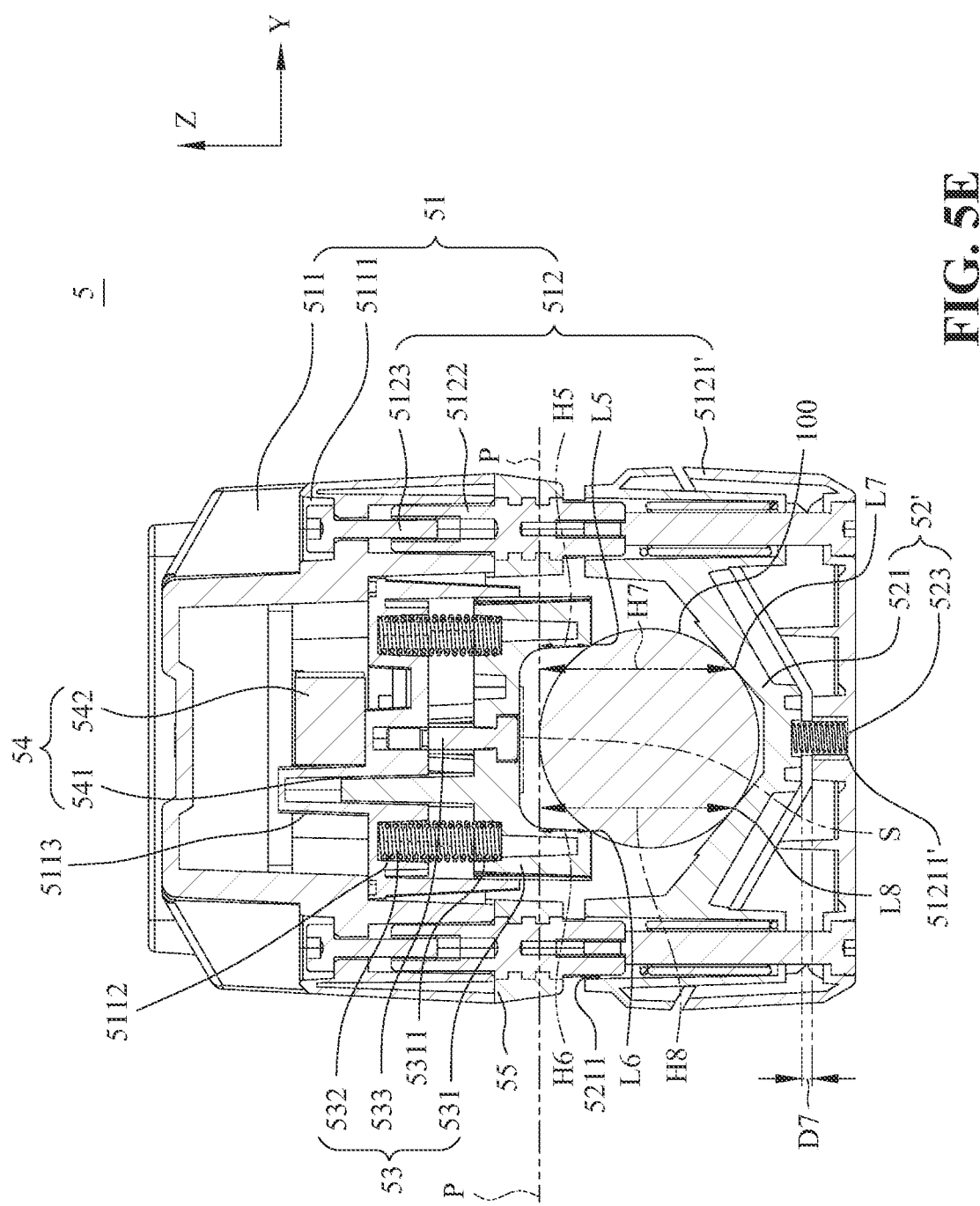
FIG. 5E is a radial schematic view of other aligning members of the fifth embodiment of the present invention.

FIG. 5A is a side view of the fixing structure of the clamp-on type measuring device of a fifth embodiment of the present invention; FIG. 5B is a top view of the other aligning members of FIG. 5A; FIG. 5C is radial cross-sectional view of the fixing structure of the clamp-on type measuring device shown in FIG. 5A before fixed on the pipeline; FIG. 5D is radial cross-sectional view of the fixing structure of the clamp-on type measuring device shown in FIG. 5A after fixed on the pipeline; and FIG. 5E is a radial schematic view of other aligning members of the fifth embodiment of the present invention.

As shown in FIGS. 5A, 5B, 5C and 5D, the fixing structure 5 of the clamp-on type pipeline measuring device includes: a clamp 51, a first aligning member 52, a second aligning member 53, an outer diameter measuring unit 54, and a limiter 55. The clamp 51 is detachably fixed on the outer surface of the pipeline 100 along the axis A1 of the outer surface of the pipeline 100, wherein the tangent plane passing through the axis A1 is defined as the installation datum plane P. After the clamp 51 is fixed on the outer surface of the pipeline 100, the first aligning member 52 contacts at least two line segments L7, L8 of the outer surface of the pipeline 100, and the second aligning member 53 contacts at least two line segments L5, L6 of the outer surface of the pipeline 100. The distances H7, H8 between the line segments L7, L8 and the installation datum plane P are the same, and the distances H5, H6 between the line segments L5, L6 and the installation datum plane P are the same.

In this embodiment, the clamp 51 includes a carrier 511 and a buckle 512. The materials and functions of the carrier 511 are as the carrier 411 of the fourth embodiment, and the carrier 511 can be equipped with a sensing element 10, a processing circuit (not shown), a power supply (not shown), a display screen, etc. The two long sides of the carrier 511 have buckle seats 5111 and aligning grooves 5112, one side of the carrier 511 has distance measuring grooves 5113, and the center of the buckle seat 5111 is formed with a through hole. The buckle 512 includes a base seat 5121, a spiral tube 5122, and a screw 5123, and can surround the outer surface of the pipeline 100 and connect to the buckle seat 5111 of the carrier 511. The base seat 5121 is an open shell, and a screw hole 51211 is formed in the center of the base seat 5121. The first aligning member 52 is disposed in the base seat 5121 of the buckle 512, includes a first slider 521 and an adjusting member 522. The first slider 521 is roughly M-shaped, and the center of the M-shape is aligned with the center of the base seat 5121. The adjusting member 522 includes a knob 5221 and a threaded segment 5222. The knob 5221 is arranged on the side of the base seat 5121 opposite to the first slider 521. The threaded segment 5222 passes through the screw hole 51211 in the center of the base seat 5121 and connects to the center of the M-shape of the first slider 521.

The two arms of the M-shape have sliding grooves 5211 and guide grooves 5212; the first slider 521 can move a distance of 0.1 mm to 10 cm along the spiral tube 5122 toward or away from the carrier 511 according to the outer diameter of the pipeline 100 required. The second aligning member 53 is arranged on both long sides of the carrier 511, includes the second slider 531, the elastic member 532, and the stop block 533. The second slider 531 is roughly in the shape of an inverted U-shape, and the center of the inverted U-shape is aligned with the center point of the short side of the carrier 511. An accommodating groove 5311 is formed in the two arms of the U shape, and the two ends of the elastic member 532 (such as but not limited to spring, leaf spring, and rubber) are respectively embedded in the aligning groove 5112 and the accommodating groove 5311. The second sliding block 531 can also move toward or away from the carrier 511 along the normal direction of the installation datum plane P for a distance of 0.1 mm to 10 cm according to the outer diameter of the pipeline 100 required, and the stop block 533 can prevent the second aligning member 53 from moving out of the carrier 511. The outer diameter measuring unit 54 includes a distance measuring shaft 541 and a displacement sensor 542. One end of the distance measuring shaft 541 is fixed on the second slider 531, and the other end of the distance measuring shaft 541 is embedded in a distance measuring groove 5113 of the carrier 511. The distance measuring shaft 541 moves with the second slider 531 in the distance measuring groove 5113. The displacement sensor 542 is arranged in the carrier 511 adjacent to the distance measuring groove 5113, and can generate a displacement data signal of the distance measuring shaft 541. The limiter 55 is arranged between the buckle seat 511 and the first slider 521, and has a protrusion 551. The protrusion 551 is embedded in the guide groove 5212 of the first slider 521, and can limit the movement distance of the first aligning member 52 to the carrier 511 along the normal direction of the installation datum plane P, so that the four screws 5123 can be evenly tightened without overlocking.

The process of installing the clamp 51 on the outer surface of the pipeline 100 includes: inserting the spiral tube 5122 into the limiter 55, screwing the screw 5123 through the base seat 5121 and the first slider 521, then into one side of the spiral tube 5122 to engage with the base seat 5121, the first aligning member 52, and the limiter 55; placing the carrier 511 and the buckle 512 on the opposite sides of the outer surface of the pipeline 100, so that the pipeline 100 is placed on the first slider 521 of the first aligning member 52; screwing the screw 5123 through the buckle seat 5111, then into the spiral tube 5122 to connect the carrier 511 and the buckle 512; rotating the adjusting member 522 to make the first slider 521 move along the spiral tube 5122 and a protruding block 551 (the normal direction of the installation datum plane P, as the Z-axis direction shown in FIG. 5C), to push the outer surface of the pipeline 100 in contact with the second slider 531, and to make the first slider 521 and the second slider 531 clamp at least four line segments on the outer surface of the pipeline 100; continuing to rotate the adjusting member 522 so that the first slider 521 and the second slider 531 clamp the pipeline 100 and move along the normal direction of the installation datum plane P until the axis A1 of the outer surface of the pipeline 100 in contact with the sensing surface S of the sensing element 10; when the clamp 51 does not move along the axial direction of the pipeline 100 or rotate along the circumference of the pipeline 100, it means that the clamp 51 has been correctly fixed on the outer surface of the pipeline 100; that is, the center line of the bottom surface of the carrier 511 is aligned with the axis A1 of the outer surface of the pipeline 100 and the sensing surface S of the sensing element 10 is set on the installation datum plane P.

The means for moving the first sliding block 521 is not limited to the above-mentioned adjusting member in the form of a bolt. FIG. 5E is a radial schematic view of other aligning members according to the fifth embodiment of the present invention. As shown in FIG. 5E, the first aligning member 52' is disposed in the base seat 5121' of the buckle 512, the first aligning member 52' includes a first slider 521 and an elastic member 523, and the center of the base seat 5121' has an accommodating groove 51211', the elastic member 523 (such as but not limited to spring, leaf spring, and rubber) is disposed in the accommodating groove 51211' of the base seat 5121' to connect the first slider 521. The elastic member 523 can provide the elastic force for the first slider 521 to push the pipeline 100. Since the elastic force of the elastic member 523 pushes the first slider 521 out of the base seat 5121' for a certain length, the maximum vertical distance between the first aligning member 52' and the second aligning member 53 is not greater than the outer diameter of the pipeline 100. The carrier 511 and the buckle 512 are placed on the two sides of the pipeline 100 opposite to each other to make the first slider 521 and the second slider 531 contact the opposite sides of the outer surface of the pipeline. When the screws 5123 are screwed into the two sides of the spiral tube 5122 to fix the carrier 511 and the buckle 512, the pipeline 100 presses the first slider 521 to move towards the base seat 5121' and the second slider 531 to move towards the carrier 511 until the axis A1 of the outer surface of the pipeline 100 in contact with the sensing surface S of the sensing element 10. The elastic forces generated by the extrusion of the elastic members 523, 533 make the first slider 521 and the second slider 531 tightly clamp the opposite sides of the outer surface of the pipeline 100, and fix the clamp 51 on the outer surface of the pipeline 100.

In the process of fixing the clamp 51 and the pipeline 100, since the pipeline 100 is first placed on the first slider 521 of the first aligning member 52, the smaller the outer diameter of the pipeline 100 is, the longer the distance that the adjusting member 522 moves the first slider 521 to make the outer surface of the pipeline 100 contact the second slider 531 will be, or the longer the distance that the screw 5123 makes the first slider 521 move toward the base seat 5121' will be, while the shorter the distance that the second slider 531 moves until the outer surface of the pipeline 100 abuts against the sensing surface S of the sensing element 10 will be when the outer surface of the pipeline 100 contacts the second slider 531. On the other hand, the larger the outer diameter of the pipeline 100 is, the shorter the distance that the adjusting member 522 moves the first slider 521 to make the outer surface of the pipeline 100 contact the second slider 531 will be, or the longer the distance that the screw 5123 makes the first slider 521 move toward the base seat 5121' will be, while the longer the distance that the second slider 531 moves until the outer surface of the pipeline 100 abuts against the sensing surface S of the sensing element 10 will be when the outer surface of the pipeline 100 contacts the second slider 531. Using the lengths D6, D7 between the starting point of the first slider 521 moving away from the base seat 5121 or toward the base seat 5121' to the fixed position of the fixed pipeline 100 as the movement distances of the first alignment member 52, 52' along the normal direction of the installation datum plane P during the installation process of clamp 51, the movement distances of the first alignment member 52, 52' along the normal direction of the installation datum plane P during the installation process of clamp 51 is inversely proportional to a size of the outer diameter of the pipeline 100. Using the length difference that the second slider 531 protrudes beyond the bottom surface of the carrier 511 before touching the outer surface of the pipeline 100 and after fixed as the movement distance of the second alignment member 53 along the normal direction of the installation datum plane P, the movement distance of the second alignment member 53 along the normal direction of the installation datum plane P is proportional to a size of the outer diameter of the pipeline 100 during the installation process of clamp 51.

By using the linear movement distance of the aligning member is proportional or inversely proportional to a size of the outer diameter of the pipeline, the distance measuring shaft 541 of the outer diameter measuring unit 54 is linked with the second aligning member 531 and is provided with optical or magnetic elements, the displacement sensor 542 of the outer diameter measuring unit 54 senses the moving distance of the distance measuring shaft 541, so as to calculate the outer diameter of the pipeline, which can be used as basic parameter for the clamp-on type pipeline measuring device to calculate the physical quantities (such as, flow velocity, flow rate, temperature) of the fluid in the pipeline.

It is worth noting that when fixing the carrier 511 and the buckle 512 with the spiral tube 5122 and the screw 5123 and fixing the clamp 51 and the pipeline 100 with the first aligning member 52, the limiter 55 disposed between the buckle seat 5111 of the carrier 511 and the first slider 521 of the first aligning member 52 can prevent the excessive application of force by individual screws 5123 and the first aligning member 52, and the application of uneven force to different screws 5123 and the first aligning member 52, so as to ensure that the clamp 51 and the pipeline 100 will not be deflected, warped or deformed.

In the process of fixing the clamp and the pipeline, since the aligning member can keep the clamp and the pipeline relatively moving along the normal direction of the installation datum plane until the sensing surface of the sensing element is fixed on the axis of the outer surface of the pipeline, the present invention is not limited to screw locking methods, such as screws, nuts, and spiral tubes.

Figure 6A:
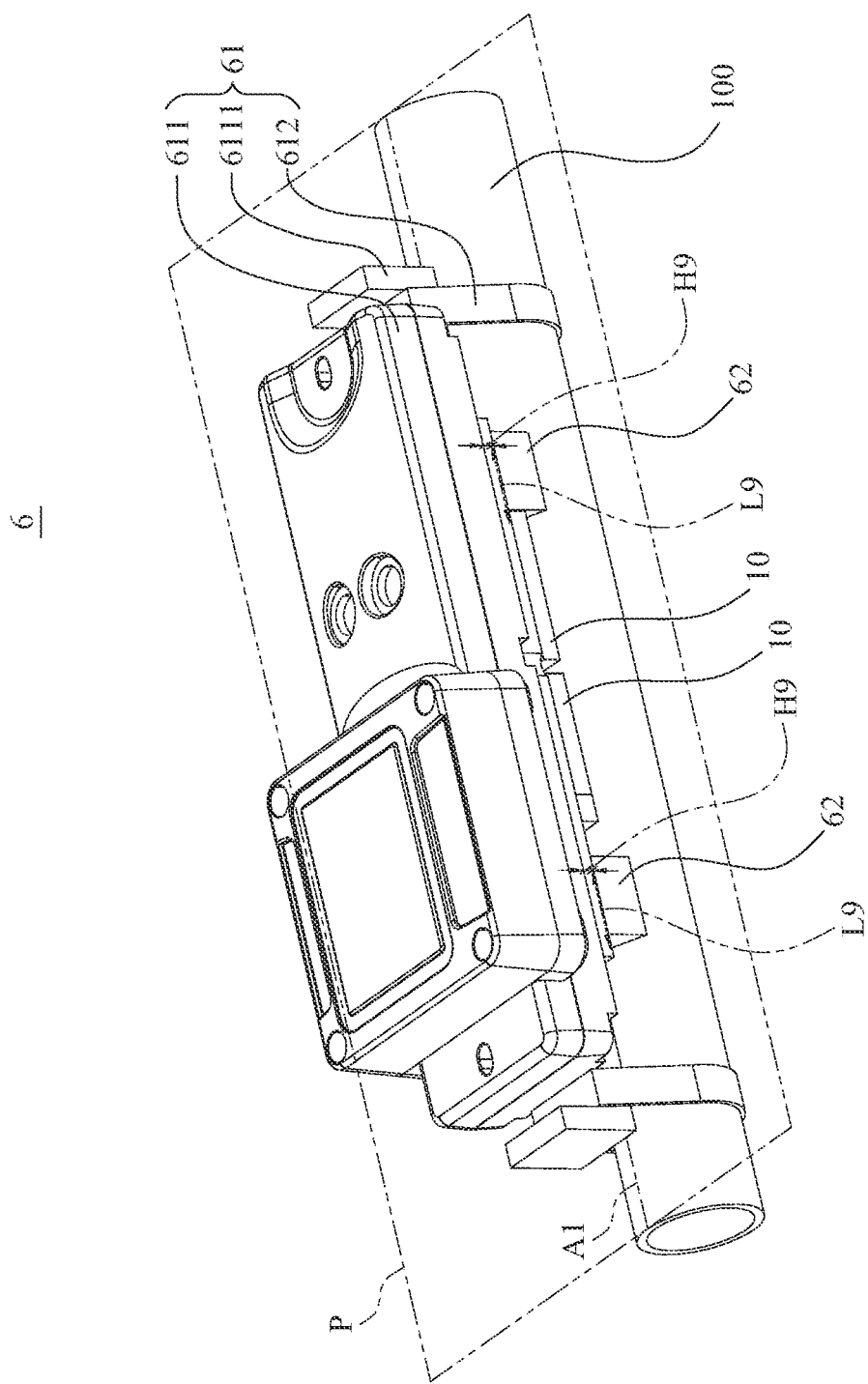
FIG. 6A is a side view of the fixing structure of the clamp-on type measuring device of a sixth embodiment of the present invention.
Figure 6B:
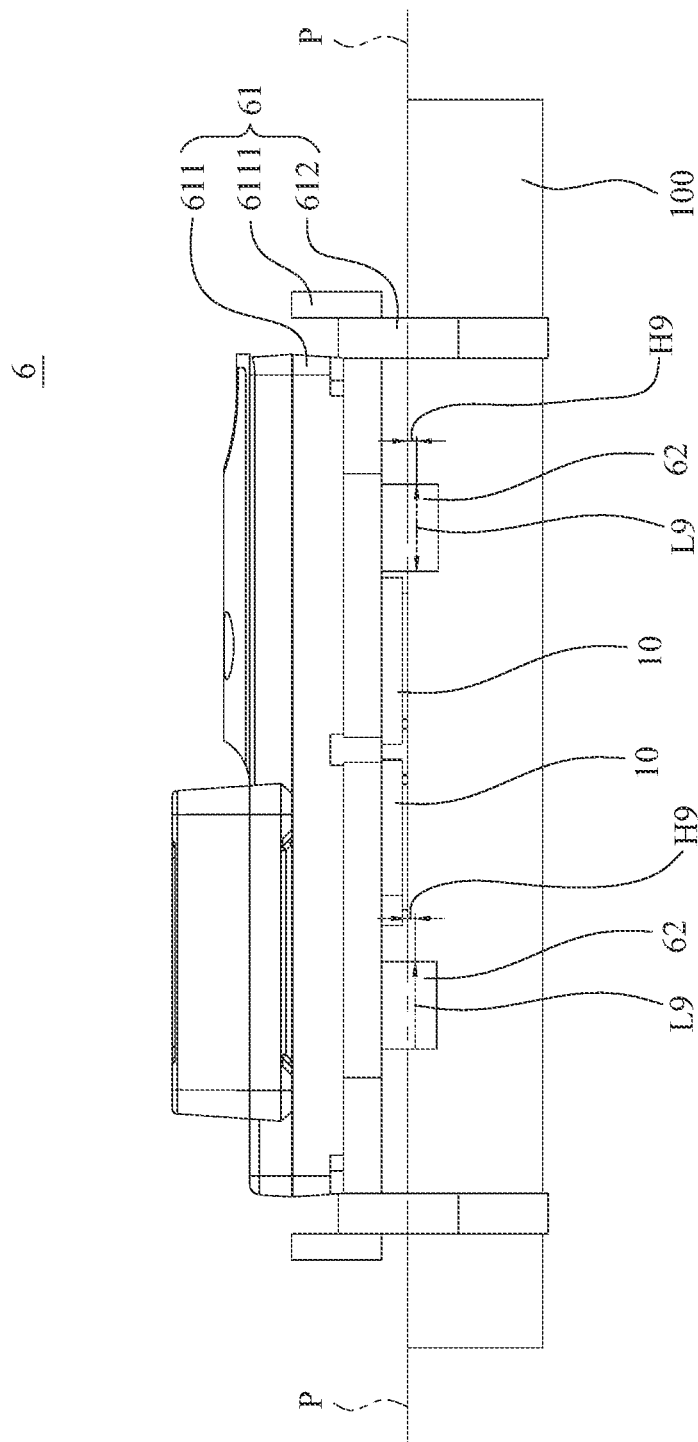
FIG. 6B is an axial view of the fixing structure of the clamp-on type measuring device shown in FIG. 6A.

FIG. 6A is a side view of the fixing structure of the clamp-on type measuring device of a sixth embodiment of the present invention; FIG. 6B is an axial view of a fixing structure of the clamp-on type measuring device shown in FIG. 6A. As shown in FIGS. 6A and 6B, the fixing structure 6 of the clamp-on type pipeline measuring device includes a clamp 61 and an aligning member 62. The clamp 61 includes a carrier 611 and a buckle 612. The material, structure, and function of the carrier 611 and the aligning member 62 are the same as those described in the first to third embodiments, the aligning member 62 is disposed in the carrier 611. During the processes of detaching and fixing the clamp 61, the aligning member 62 moves along the normal direction of the installation datum plane P. After the clamp 61 is fixed on the outer surface of the pipeline 100, the aligning member 62 contacts at least two line segments L9 on the outer surface of the pipeline 100, and the distances H9 between the two line segments L9 and the installation datum plane P are the same. In this embodiment, the buckle 612 is a belt, which surrounds the outer surface of the pipeline 100 and connects to the buckle seat 6111 of the carrier 611, so that the clamp 61 is fixed on the pipeline 100.

Figure 7A:
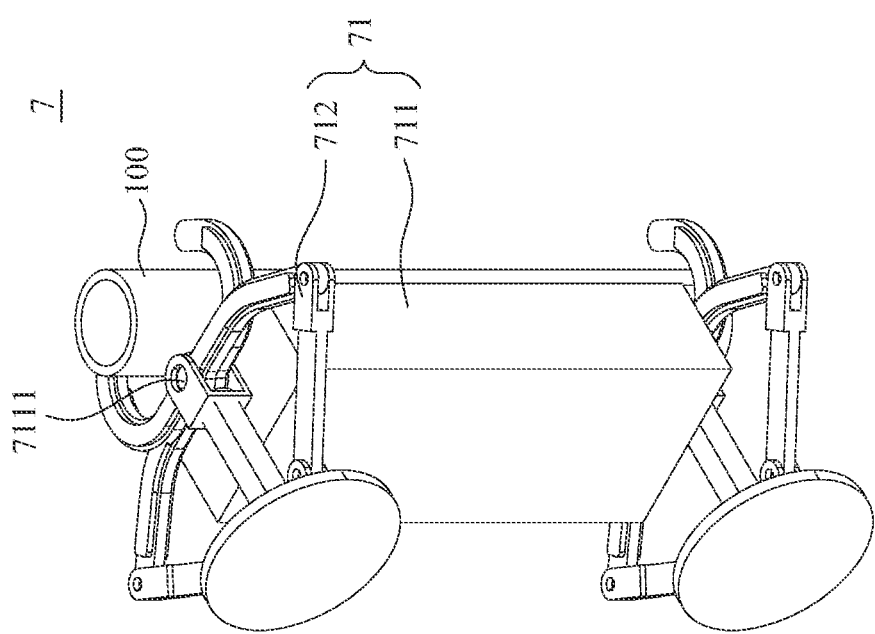
FIG. 7A is a side view of the fixing structure of the clamp-on type measuring device of a seventh embodiment of the present invention.
Figure 7B:
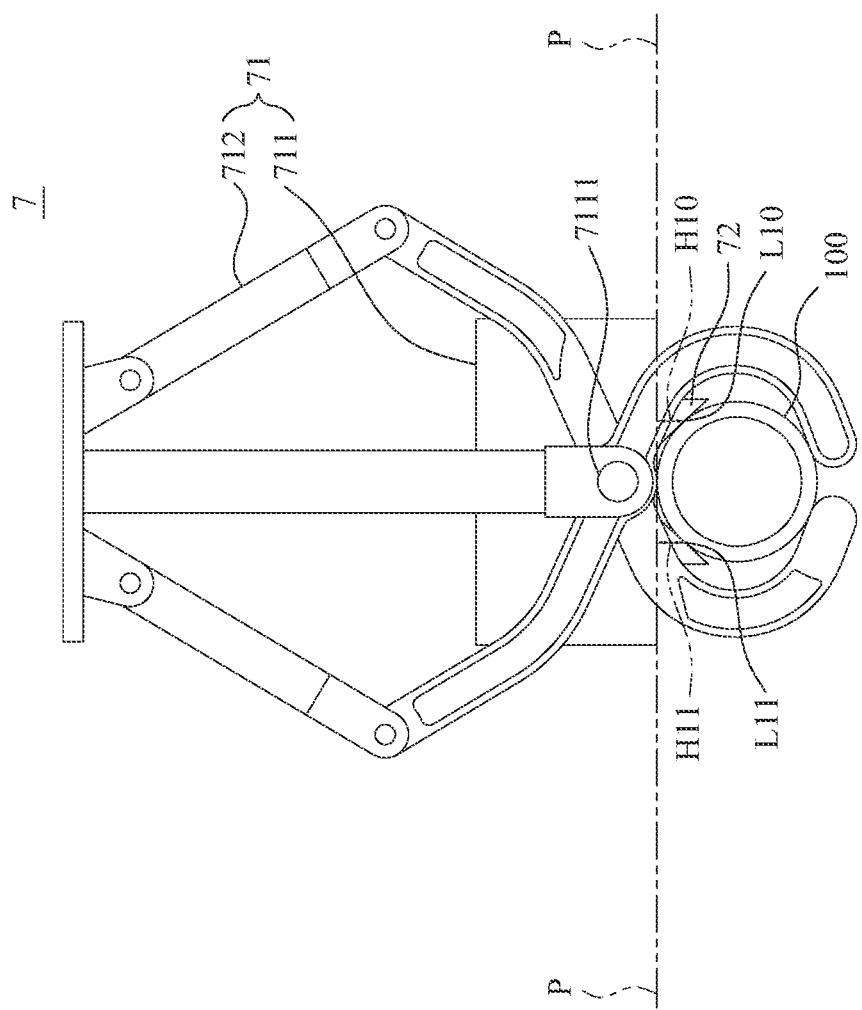
FIG. 7B is a radial view of a fixing structure of the clamp-on type measuring device shown in FIG. 7A.
Figure 8A:
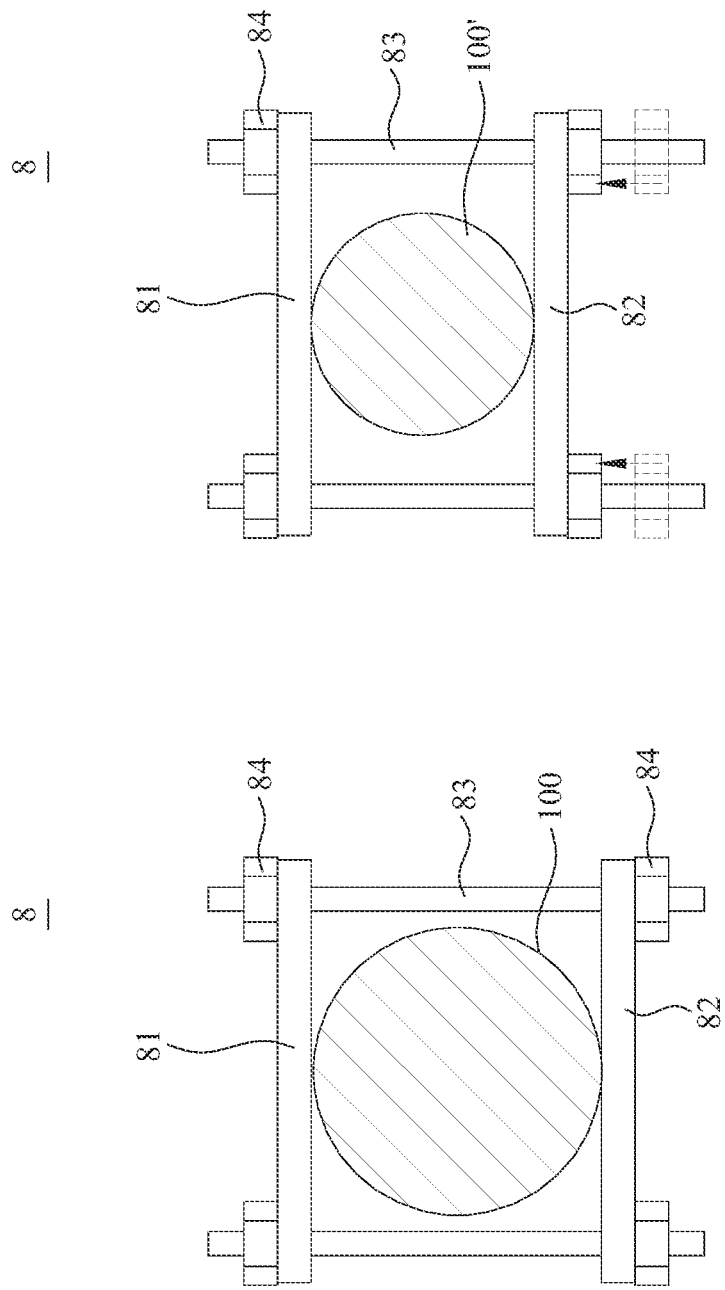
FIG. 8A and FIG. 8B are radial views of the fixing structure of the conventional clamp-on type measuring device.
Figure 8B:
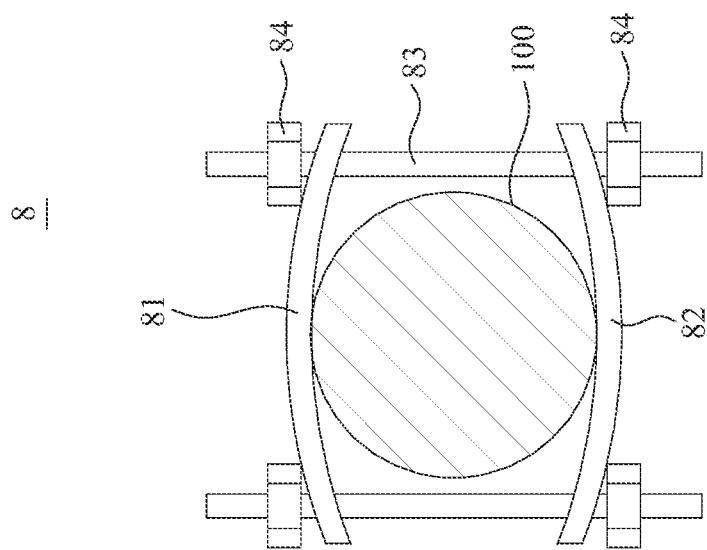

FIG. 7A is a side view of the fixing structure of the clamp-on type measuring device of a seventh embodiment of the present invention; FIG. 7B is a radial view of a fixing structure of the clamp-on type measuring device shown in FIG. 7A. As shown in FIGS. 7A and 7B, the fixing structure 7 of the clamp-on type pipeline measuring device includes a clamp 71 and an aligning member 72, and the clamp 71 includes a carrier 711 and a buckle 712. The materials, structure and functions of the carrier 711 and an aligning member 72 are the same as described in the first to third embodiments; the aligning member 72 is disposed in the carrier 711. During the processes of disassembling and fixing the clamp 71, the aligning member 72 moves along the normal direction of the installation datum plane P. After the clamp 71 is fixed on the outer surface of the pipeline 100, the aligning member 72 contacts at least two line segments L10, L11 on the outer surface of the pipeline 100, and the distances H10, H11 between the line segments L10, L11 and the installation datum plane P are the same. In this embodiment, the buckle 712 is a pipe clamp, and the buckle seat 7111 connected to the carrier 711 can clamp the outer surface of the pipeline 100 so that the clamp 71 is fixed on the outer surface of the pipeline 100.

It is worth noting that the above-mentioned embodiments show and illustrate that the sensing element is arranged in the carrier, and the carrier is set on one side of the outer surface of the pipeline. However, other embodiments wherein the sensing element is arranged in the clamp, or the two opposite sides of the outer surface of the pipeline are provided with the carriers, a plurality of sensing elements are arranged in the two carriers, and the buckles surround the outer surface of the pipeline and connects the two carriers, are also within the scope of the technical content of the present invention.

The present invention provides a clamp-on type pipeline measuring device, including a fixing structure and a sensing element as described in the above-mentioned embodiments, the fixing structure includes a clamp and an aligning member, wherein the clamp is detachably fixed on the outer surface of the pipeline, the aligning member is disposed in the clamp; the sensing element is arranged in the clamp and has a sensing surface. When the outer surface of the pipeline contacts the sensing surface, the clamp is fixed on the outer surface of the pipeline, the aligning member contacts at least two line segments on the outer surface of the pipeline, and the distances between the two line segments and the sensing surface are the same. As described in the above-mentioned first to seventh embodiments, the clamp includes the carrier and the buckle, the aligning member is disposed in the carrier or the buckle, and the sensing element is at least one of ultrasonic probe, temperature sensor, and vibration sensor.

In summary, in the fixing structure of the clamp-on type pipeline measuring device of the present invention, the aligning member can be applied to pipelines with different pipe diameters, especially pipes with the same nominal diameter of different pipeline standards. In the process of fixing the clamp and the pipeline, the aligning member moves along the normal direction of the tangent plane which passes through the axis of the outer surface of the pipeline, so that the center line of the clamp can be aligned with the axis of the outer surface of the pipeline. After the clamp is fixed on the outer surface of the pipeline, the aligning member contacts at least two line segments equidistant from the outer surface of the pipeline and the installation datum plane, which can keep the clamp in the correct installation position, so that the sensing surface of the sensing element is set on the outer surface of the pipeline on the tangent plane of the axis. The clamp-on type pipeline measuring device of the present invention reduces the use of screws to adjust the residual between the clamp and the pipeline, and effectively prevents the clamp, pipeline, and sensing elements from shifting, warping, deforming and being damaged due to improper installation, and thus, improves the convenience of installation and ensure the correctness of the measurement of the clamp-on type pipeline measuring device.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fixing structure of a clamp-on type pipeline measuring device, comprising:
   a clamp, detachably fixed on an outside surface of a pipeline along an axis of the outer surface of the pipeline; and
   an aligning member, disposed in the clamp, wherein a plane tangent to the outer surface of the pipeline on the axis is defined as an installation datum plane; during detaching and fixing the clamp, the aligning member moves along a normal direction of the installation datum plane; after the clamp is fixed to the outer surface of the pipeline, the aligning member contacts at least two line segments on the outer surface of the pipeline, and distances between the two line segments and the installation datum plane are the same.

2. The fixing structure of the clamp-on type pipeline measuring device according to claim 1, wherein the clamp comprises a carrier and a buckle, the carrier is set on the installation datum plane, and the buckle surrounds the outer surface of the pipeline and connects to the carrier.

3. The fixing structure of the clamp-on type pipeline measuring device according to claim 2, wherein the aligning member is arranged in the carrier, and a distance that the aligning member moves along the normal direction of the installation datum plane is proportional to a size of an outer diameter of the pipeline.

4. The fixing structure of the clamp-on type pipeline measuring device according to claim 2, wherein the aligning member is arranged in the buckle, and a distance that the aligning member moves along the normal direction of the installation datum plane is inversely proportional to a size of an outer diameter of the pipeline.

5. The fixing structure of the clamp-on type pipeline measuring device according to claim 4, further comprising an outer diameter measuring unit, arranged on the carrier; wherein the outer diameter measuring unit moves along the normal direction of the installation datum plane during the detaching and fixing the clamp, and a distance that the outer diameter measuring unit moves along the normal direction of the installation datum plane is proportional to the size of the outer diameter of the pipeline.

6. The fixing structure of the clamp-on type pipeline measuring device according to claim 1, wherein the aligning member comprises a slider, the slider has two protruding arms, and a surface between the two arms is in the shape of a single angle, a polygon, a plane, or an arc.

7. The fixing structure of the clamp-on type pipeline measuring device according to claim 6, wherein the aligning member further comprises an elastic member, and two ends of the elastic member are respectively embedded in the clamp and the slider, so as to generate an elastic force for moving the aligning member along the normal direction of the installation datum plane.

8. A clamp-on type pipeline measuring device, comprising:
   the fixing structure according to claim 1 comprising: the clamp and the aligning member, wherein the clamp is detachably fixed on an outer surface of a pipeline, the aligning member is disposed in the clamp; and
   a sensing element, arranged in the clamp and having a sensing surface; wherein when the outer surface of the pipeline contacts the sensing surface, the clamp is fixed on the outer surface of the pipeline, the aligning member contacts at least two line segments of the outer surface of the pipeline, and distances between the two line segments and the sensing surface are the same.

9. The clamp-on type pipeline measuring device according to claim 8, wherein the clamp comprises a carrier and a buckle, and the aligning member is arranged in the carrier and/or the buckle.

10. The clamp-on type pipeline measuring device according to claim 8, wherein the sensing element is at least one of an ultrasonic probe, a temperature sensor, and a vibration sensor.

* * * * *